(12) United States Patent
Mansfield

(10) Patent No.: US 7,755,768 B2
(45) Date of Patent: Jul. 13, 2010

(54) APPARATUS FOR AND A METHOD OF DETERMINING A CHARACTERISTIC OF A LAYER OR LAYERS

(75) Inventor: Daniel Mansfield, Leicester (GB)

(73) Assignee: Taylor Hobson Limited, Leicester (GB)

( * ) Notice: Subject to any disclaimer, the term of this patent is extended or adjusted under 35 U.S.C. 154(b) by 533 days.

(21) Appl. No.: 11/653,700

(22) Filed: Jan. 16, 2007

(65) Prior Publication Data

US 2007/0188768 A1 Aug. 16, 2007

Related U.S. Application Data

(63) Continuation-in-part of application No. PCT/GB2005/002783, filed on Jul. 14, 2005, now abandoned.

(51) Int. Cl.
*G01B 11/02* (2006.01)
(52) U.S. Cl. ..................... 356/497; 356/503
(58) Field of Classification Search ............... 356/485, 356/497, 511, 512, 503, 504, 630, 632; 702/109, 702/155–159, 166, 167, 170
See application file for complete search history.

(56) References Cited

U.S. PATENT DOCUMENTS

| | | | | |
|---|---|---|---|---|
| 1,688,457 A | * | 10/1928 | Eichengrun | 264/218 |
| 4,555,767 A | * | 11/1985 | Case et al. | 250/341.4 |
| 4,748,329 A | * | 5/1988 | Cielo et al. | 250/559.28 |
| 5,159,408 A | * | 10/1992 | Waldenmaier et al. | 356/485 |
| 5,633,712 A | * | 5/1997 | Venkatesh et al. | 356/503 |

(Continued)

FOREIGN PATENT DOCUMENTS

EP 0762077 3/1997

(Continued)

OTHER PUBLICATIONS

Conroy and Mansfield, "Measuring microscale devices" Nov. 2008, Nature (photonics), vol. 2, pp. 661-663.*

(Continued)

*Primary Examiner*—Gregory J Toatley, Jr.
*Assistant Examiner*—Scott M Richey
(74) *Attorney, Agent, or Firm*—RatnerPrestia

(57) ABSTRACT

In respective measurement operations on a first sample surface area having a layer structure (81) and a characterized second sample surface area (82), light reflected by the region of the sample surface and the reference surface interfere and a sensing device (10) senses light intensity representing interference fringes at intervals during the relative movement along a measurement scan path to provide first intensity data in the form of a first series of intensity values resulting from a measurement operation on the first sample surface area and second intensity data in the form of a second series of intensity values resulting from a measurement operation on the second sample surface area. A layer structure determiner (100) determines a frequency transform ratio corresponding to a ratio between the first and second intensity data and fits a layer structure model having variable model parameters related to the layer thicknesses and refractive indices of the layers of a layer structure to the determined ratio by adjusting the model parameters, thereby obtaining for the model parameters values representing the layer thicknesses and refractive indices of the layers of the sample layer structure.

54 Claims, 11 Drawing Sheets

U.S. PATENT DOCUMENTS

| | | | |
|---|---|---|---|
| 6,198,533 B1 * | 3/2001 | Meeks et al. ............... | 356/630 |
| 6,545,763 B1 | 4/2003 | Kim et al. | |
| 6,552,803 B1 * | 4/2003 | Wang et al. ................. | 356/503 |
| 6,897,964 B2 * | 5/2005 | Takahashi et al. ........... | 356/503 |
| 7,019,841 B2 * | 3/2006 | Mathur ....................... | 356/497 |
| 7,106,454 B2 * | 9/2006 | De Groot et al. ............ | 356/511 |
| 7,116,429 B1 * | 10/2006 | Walecki et al. ............. | 356/503 |
| 7,139,081 B2 * | 11/2006 | De Groot .................... | 356/503 |
| 7,283,256 B2 * | 10/2007 | Bristow et al. .............. | 356/630 |
| 7,289,225 B2 * | 10/2007 | De Groot .................... | 356/497 |
| 7,298,494 B2 * | 11/2007 | De Groot .................... | 356/497 |
| 7,324,214 B2 * | 1/2008 | De Groot et al. ............ | 356/511 |
| 7,345,770 B2 * | 3/2008 | Chan et al. .................. | 356/489 |
| 7,365,852 B2 * | 4/2008 | Schleifer .................... | 356/440 |
| 7,379,189 B2 * | 5/2008 | Suzuki et al. ............... | 356/503 |
| 7,385,707 B2 * | 6/2008 | Bankhead et al. ........... | 356/497 |
| 7,423,761 B2 * | 9/2008 | Teramura et al. ............ | 356/479 |
| 7,518,733 B2 * | 4/2009 | Bankhead et al. ........... | 356/511 |
| 7,612,891 B2 * | 11/2009 | Wan ........................... | 356/503 |
| 2004/0231993 A1 * | 11/2004 | Price ........................... | 205/81 |
| 2006/0012582 A1 * | 1/2006 | De Lega ..................... | 345/176 |
| 2008/0180685 A1 * | 7/2008 | De Lega et al. ............. | 356/511 |
| 2009/0051924 A1 * | 2/2009 | Ito et al. ...................... | 356/503 |

FOREIGN PATENT DOCUMENTS

| | | |
|---|---|---|
| GB | 2310884 | 9/1997 |
| GB | 2395777 A * | 6/2004 |
| WO | WO 94/00733 | 1/1994 |
| WO | WO 03/078925 | 9/2003 |
| WO | WO 2004/023071 | 3/2004 |
| WO | WO 2004/048886 | 6/2004 |
| WO | WO 2004/057267 | 7/2004 |
| WO | WO 2004/079294 | 9/2004 |
| WO | WO 2004/079294 A2 * | 9/2004 |

OTHER PUBLICATIONS

Mike Conroy, "Interferometry of thick and thin films," 2007, Proc. of SPIE, vol. 6616, pp. 661620-1 to 20-9.*

Byron S. Lee and Timothy C. Strand; *Profilometry with A Coherence Scanning Microscope*; Applied Optics vol. 29, No. 26, Sep. 10, 1990 at pp. 3784 to 3788.

Seung-Woo Kim and Gee-Hong Kim; *Thickness-Profile Measurement of Transparent Thin-Film Layers by White-Light Scanning Interferometry*; Applied Optics vol. 38 No. 28; October 1, 1999 at pp. 5968 to 5973.

William H. Press et al. (ISBN 0 521 43064); *Numerical Recipes in Fortran: The Art of Scientific Computing, Second Edition*; Section 10.6 pp. 413 to 416, 1992.

Haruna et al.; *Simultaneous Measurement of the Phase and Group Indices and the Thickness of Transparent Plates by Low-Coherence, Interferometry*; Optics Letters, Optical Society of America, vol. 23, No. 12, pp. 966 to 968, June 15, 1998; XP 000766610.

Daniel Mansfield; *The Distorted Helix: Thin Film Extraction From Scanning White Light Interferometry*; Published in Proc of SPIE vol. 6186 618600, (2006) at pp. 1 to 11.

International Search Report for PCT/GB/2005/002783; Completed Sep. 19, 2005 mailed Oct. 5, 2005.

Patents Act 1977: Search Report Under Section 17; Application No. GB0415766.5; Oct. 29, 2004.

* cited by examiner

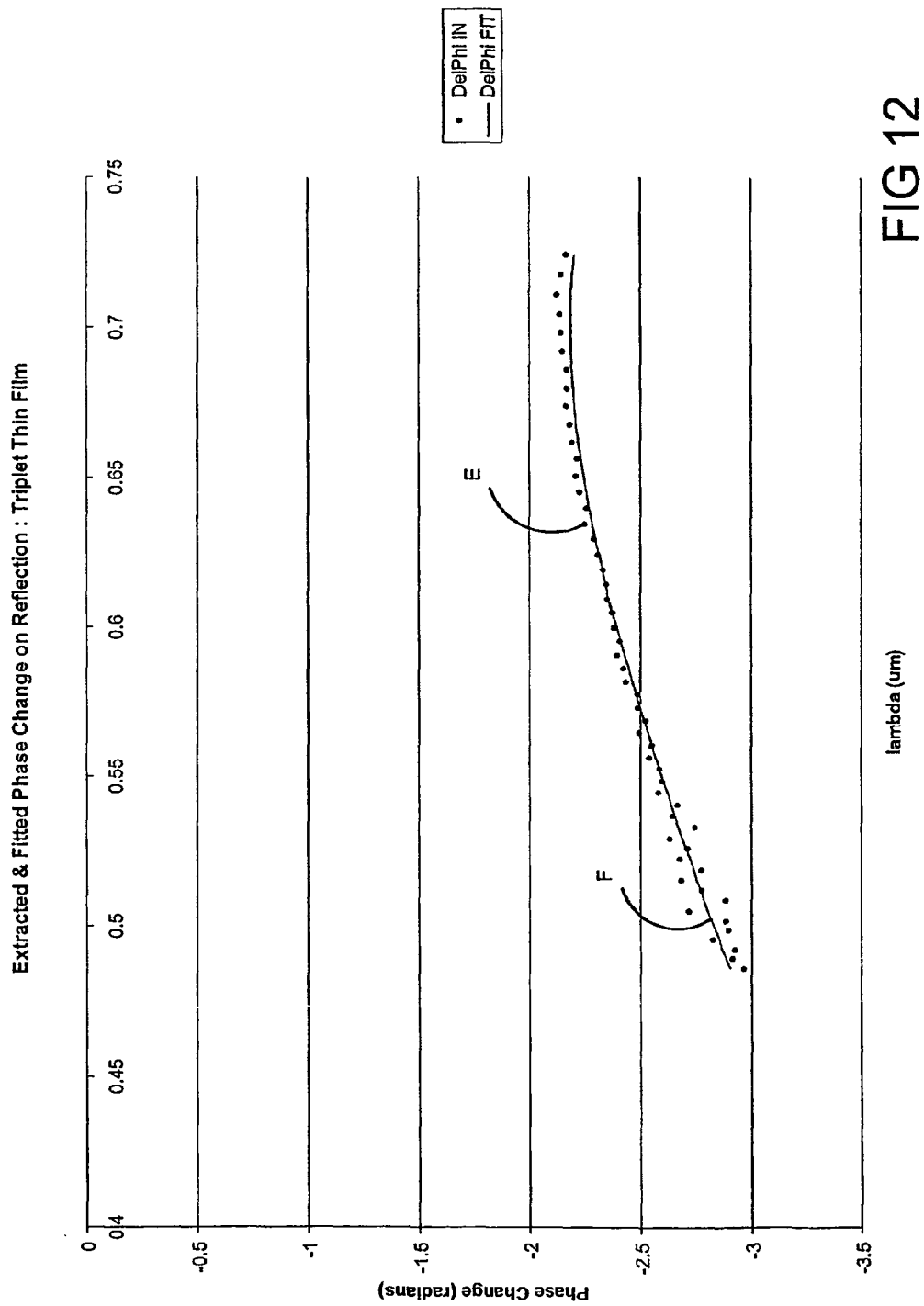

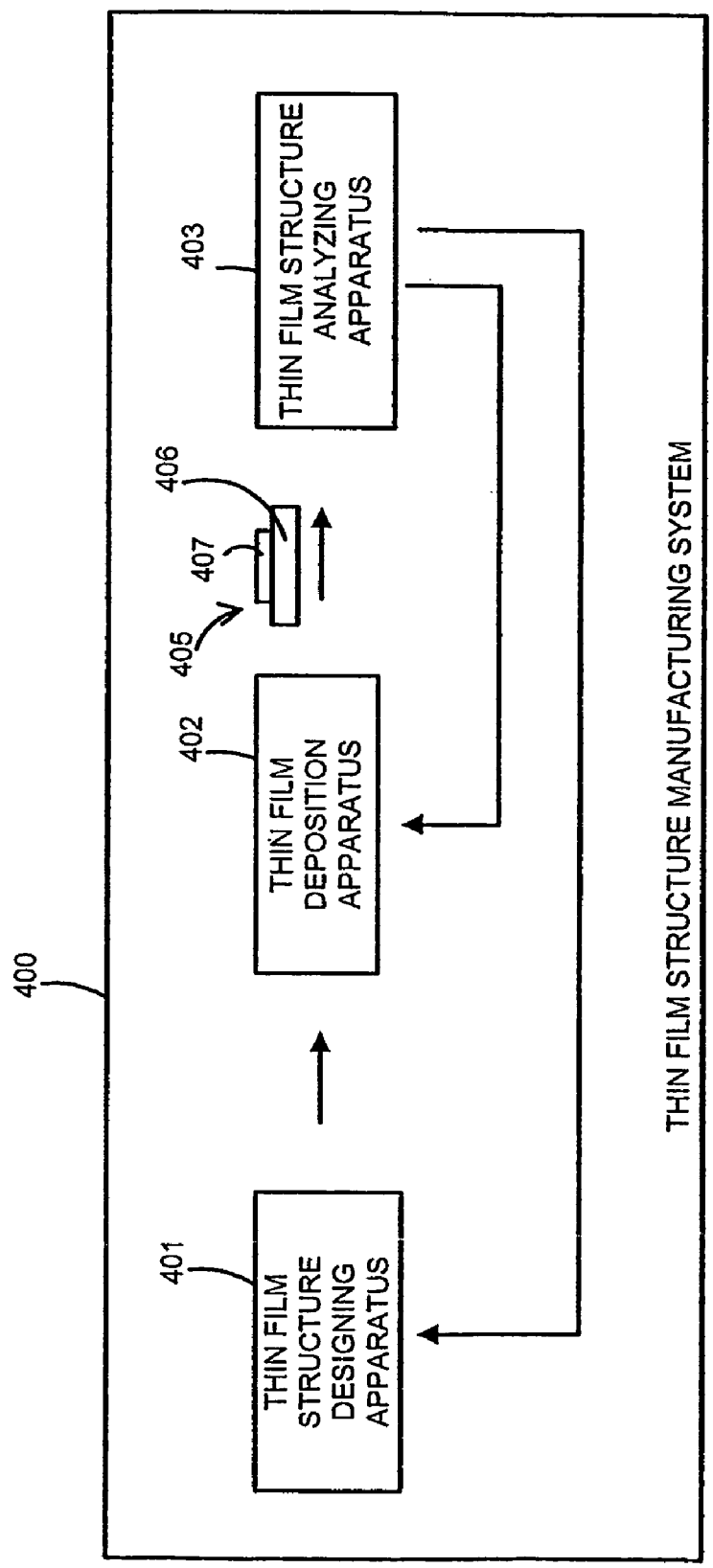

APPARATUS FOR AND A METHOD OF DETERMINING A CHARACTERISTIC OF A LAYER OR LAYERS

This application is a continuation-in-part of International Application No. PCT/GB/2005/002783, filed Jul. 14, 2005, now abandoned, which is a claims priority of GB Application No. 415766.5, filed Jul. 14, 2004, now abandoned.

This invention relates to apparatus for and a method of determining a characteristic of a layer or layers such as a thin film or thin film structure on a substrate.

Whilst thin film characterisation is possible using, for example, a spectrophotometer or ellipsometer, these only enable resolution of minimum lateral dimensions of typically a few mm and around 50 microns, respectively.

Coherence scanning or broadband scanning interferometer (sometimes called "White-light scanning interferometry") is discussed in a paper entitled "Profilometer with a Coherence Scanning Microscope" by Byron S. Lee and Timothy C Strand published in Applied Optics Volume 29, No. 26 10 Sep. 1990 at pages 3784 to 3788.

Coherence scanning or broadband scanning interferometer uses a standard interferometer such as a Michelson, Mirau or Linnik interferometer with a broadband spatially incoherent light source such as a quartz halogen lamp. Unlike narrow band or single wavelength interferometer, coherence scanning or broadband scanning interferometer does not suffer from a wavelength limited unambiguous range, but can provide practical measurement ranges easily exceeding hundreds of micrometers.

In coherence scanning or broadband scanning interferometer, as one of the sample surface whose profile is to be determined and the reference mirror of the interferometer is moved relative to the other along a scan path to change the relative path length, a two dimensional image sensor such as a CCD camera is used to sense the resulting interference pattern such that each sensing element or pixel of the image sensor senses the portion of the interference pattern for a corresponding surface region or surface pixel of the sample surface.

As the sample surface and the reference mirror are moved relative to one another, the amount or intensity of light received by a sensing element will vary in accordance with the change in the interference fringes and, as shown in FIG. 2, a coherence peak or extremum (maximum or minimum amplitude) occurs at the position along the scan path Z of zero path difference. Where different regions of the surface have different relative heights, then those different regions will have coherence peaks at different positions along the scan path. Accordingly, the relative positions of the coherence peaks can be used to provide surface profile data, that is data representing the relative height of the different regions of the sample surface.

As is well known, a phase change occurs on reflection from a surface. Where the sample being measured consists of a substrate coated with a single thin layer of material with a thickness less than the coherence length, then although the phase change on reflection will affect the determined absolute height measurements, it should not significantly affect relative height measurements because the phase change should be the same for different points on the sample surface. For thick films (with thicknesses in excess of the coherence length), the individual layer thicknesses are inherently retrievable because there is a coherence peak associated with every interface; any corresponding phase changes are Fresnel-induced. However, it is very difficult to determine the thickness of a layer on a substrate or the thicknesses of layers in a layer structure such as a thin film structure where the layer thickness is less than the coherence length of the light source because the interference pattern resulting from the thin film structure produces only a single coherence peak, that is the contributions to the interference signature associated with the different thin film layers cannot be resolved.

U.S. Pat. No. 6,545,763 and a related paper by the inventors Seung-Woo Kim and Gee-Hong Kim entitled "Thickness-profile measurement of transparent thin film layers by white-light scanning interferometry" published in Applied Optics Volume 38, Number 28 on 1 Oct. 1999 at pages 5968 to 5973 describe a technique that represents the white light source as a sum of several wavelengths within a uniform bandwidth and that determines a relationship between profile information and phase variation by considering the interference signal as an incoherent superposition:

$$\Phi(k)=2hk+\phi(k,d)$$

where the first term is linearly proportional to k the propagation vector or angular wavenumber and the second term $\phi(k,d)$ represents the phase variation due to multiple reflections from the thin film layer. Where the film thickness is not negligible, the second term is sinusoidally non-linear with respect to k. In order to determine the unknown step height h and layer thickness d, an error function is defined as:

$$\chi(h,d) = \int_{k_c-\Delta k/2}^{k_c+\Delta k/2} [\Phi^m(k) - \Phi^c(k;h,d)]^2 \, dk$$

The unknowns h and d are then regarded as independent variables and are determined so as to minimise the error function using the Levenberg-Marquardt nonlinear least squares algorithm.

The above approach however makes use only of the phase information in the interference signal.

In one aspect, the present invention provides apparatus for and a method of determining information such as at least one of a refractive index and layer thickness for a layer or layers such as a thin film or thin film structure on a substrate that enables both the amplitude and phase information in an interference signal from a broadband or coherence scanning interferometer to be used and so should enable more accurate results.

In one aspect, the present invention provides apparatus for and a method of determining information such as at least one of a refractive index value and a layer thickness value for a layer or layers on a substrate by determining a ratio between a frequency transform of the interference data or data relating to the interference data for the layer structure and a frequency transform of the interference data or data relating to the interference data for the substrate or a reference, providing an optical admittance model of this ratio where the optical admittance model requires parameters related to the layer structure, in particular the number of layers, their dispersive refractive indices and thicknesses, and carrying out a fitting procedure using the determined ratio to obtain the parameters of the optical admittance model. This enables both the amplitude and phase information in the interference data to be used and should therefore enable more accurate characterization of the layer structure parameters to be achieved.

In an embodiment, characterisation of a thin film layer or layer structure with minimum lateral dimensions of a few micrometers can be achieved.

Embodiments of the present invention will now be described, by way of example, with reference to the accompanying drawings, in which:

FIG. 12 shows a graph of phase change on reflection (in radians) against wavelength ($\lambda$) for a triplet thin film; and FIG. 13 shows a simplified block diagram of a thin film structure manufacturing system.

Figure 1:
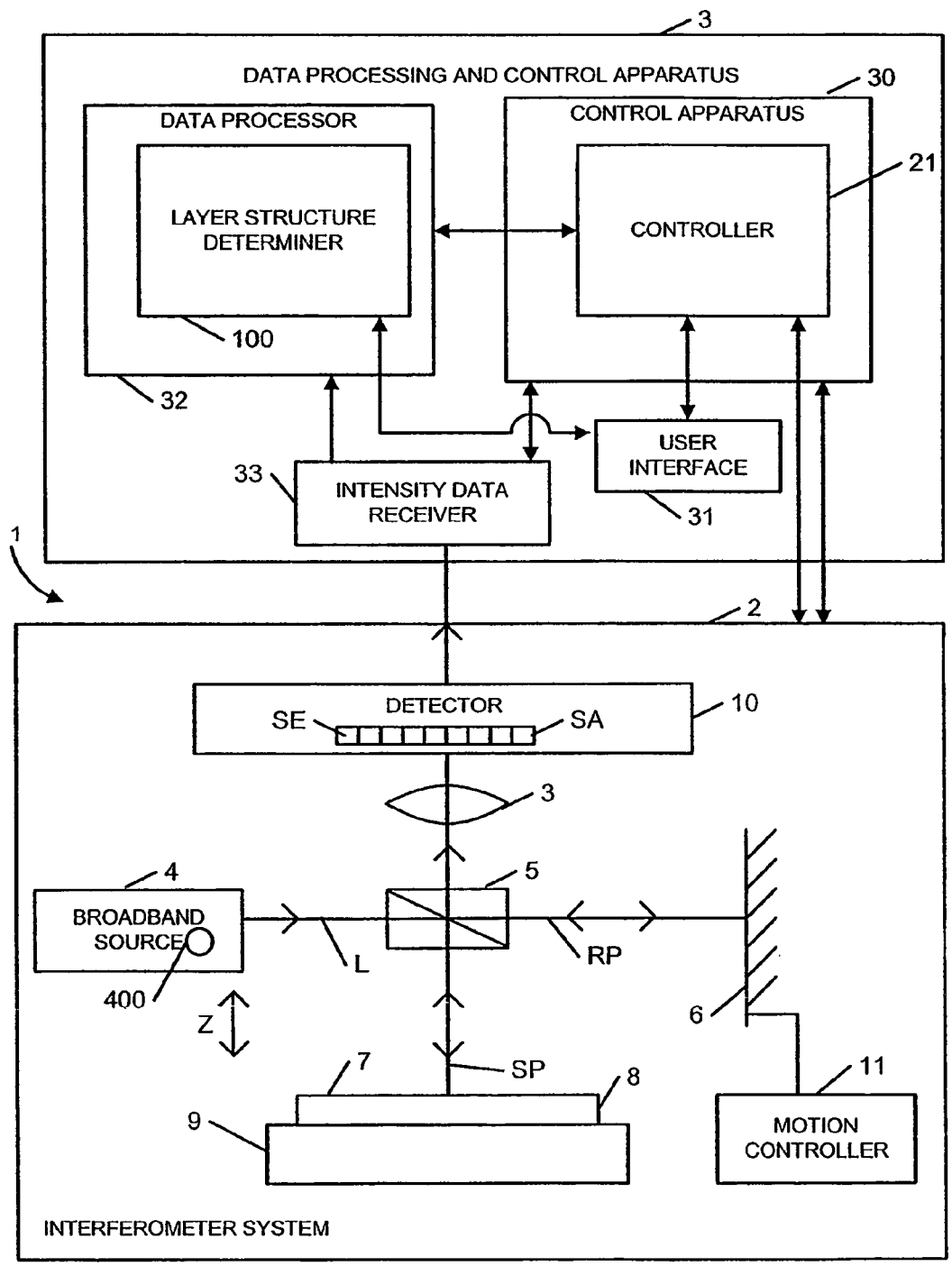
FIG. 1 shows a schematic block diagram of apparatus for determining a layer structure, the apparatus comprising an interferometer system and a data processing and control apparatus.

Referring now the drawings, FIG. 1 shows a simplified schematic block diagram of apparatus 1 for determining characteristics of a layer or layers such as a thin film or thin film structure on a substrate or base.

The apparatus 1 has a broadband or coherence scanning interferometer system 2 and data processing and control apparatus 3.

The broadband scanning interferometer system 2 is based on a conventional interferometer and, typically, has a Mirau, Michelson or Linnik configuration, for example. As discussed in the introduction, instead of having a monochromatic spatially coherent light source, the broadband scanning interferometer system 2 has a broadband source 4 which may be, for example, a white light source such as a quartz halogen lamp coupled to a regulated DC power supply having a light intensity output user control 400 provided, for example, in the form of a user-rotatable knob.

The broadband source 4 provides broadband light L which is split by a beam splitter (illustrated in FIG. 1 as a single beam splitting prism) 5 into a first light beam which is directed along a reference path RP towards a reference mirror 6 and a second light beam which is directed along a sample path SP towards a surface 7 of a sample 8 mounted on a sample support stage 9. Light reflected from the reference mirror 6 returns along the reference path RP to the beam splitter 5 where it interferes with light reflected from the sample surface 7 back along the sample path SP. A focussing element 3 is provided to focus an image of the region of interference onto a detector 10.

In this embodiment, the detector 10 has a 2D (two-dimensional) array SA of image sensing elements SE, one row of which is shown very diagrammatically in FIG. 1. The array SA images an area of the sample surface 7 falling within the field of view of the detector 10. Each individual sensing element SE of the 2D sensing array of the detector 10 detects the portion of the interference pattern falling within the acceptance cone of that element and resulting from a corresponding surface region or surface pixel of the area of the sample surface 7 so that, effectively, the imaged area of the surface can be considered as a 2D array of surface regions or surface pixels. In this example, the detector 10 is a CCD (Charge Coupled Device) digital camera, for example, a Vosskuhler GmbH: CCD 1300 CCD digital camera. As another possibility, a CMOS detector having a 2D (two-dimensional) xy array of CMOS sensing elements may be used. In either case, generally each of the sensing elements is square to provide the same resolution in both directions (x and y) of the array.

A motion controller 11 is provided to effect relative movement between the sample 8 and the reference mirror 6 so as to change the difference between the lengths of the paths travelled by light reflected from the reference mirror 6 and light reflected from the sample surface 7. As shown in FIG. 1, the motion controller 11 is arranged to move the reference mirror 6 and objective lens combination along the reference path RP (see FIG. 3 because, for simplicity, FIG. 1 shows the motion controller simply coupled to the reference mirror 6). This is equivalent to moving the sample surface 7 along a scan path in the Z direction shown in FIG. 1.

The detector 10 is arranged to capture or sense the light intensity (i.e. the interference pattern) at intervals as the path length difference between the sample 8 and the reference mirror 6 is changed. In this example, the detector captures or senses the light intensity at intervals corresponding to axial changes in the relative position of the sample 8 of $\Delta z_{step} = \lambda/8$, where $\lambda$ is the nominal mean wavelength of the broadband source and the step is typically 75 nm. 2D image or frame data representing the intensity pattern for the field of view of the detector 10 is acquired by the detector 10 at each interval.

Figure 2:
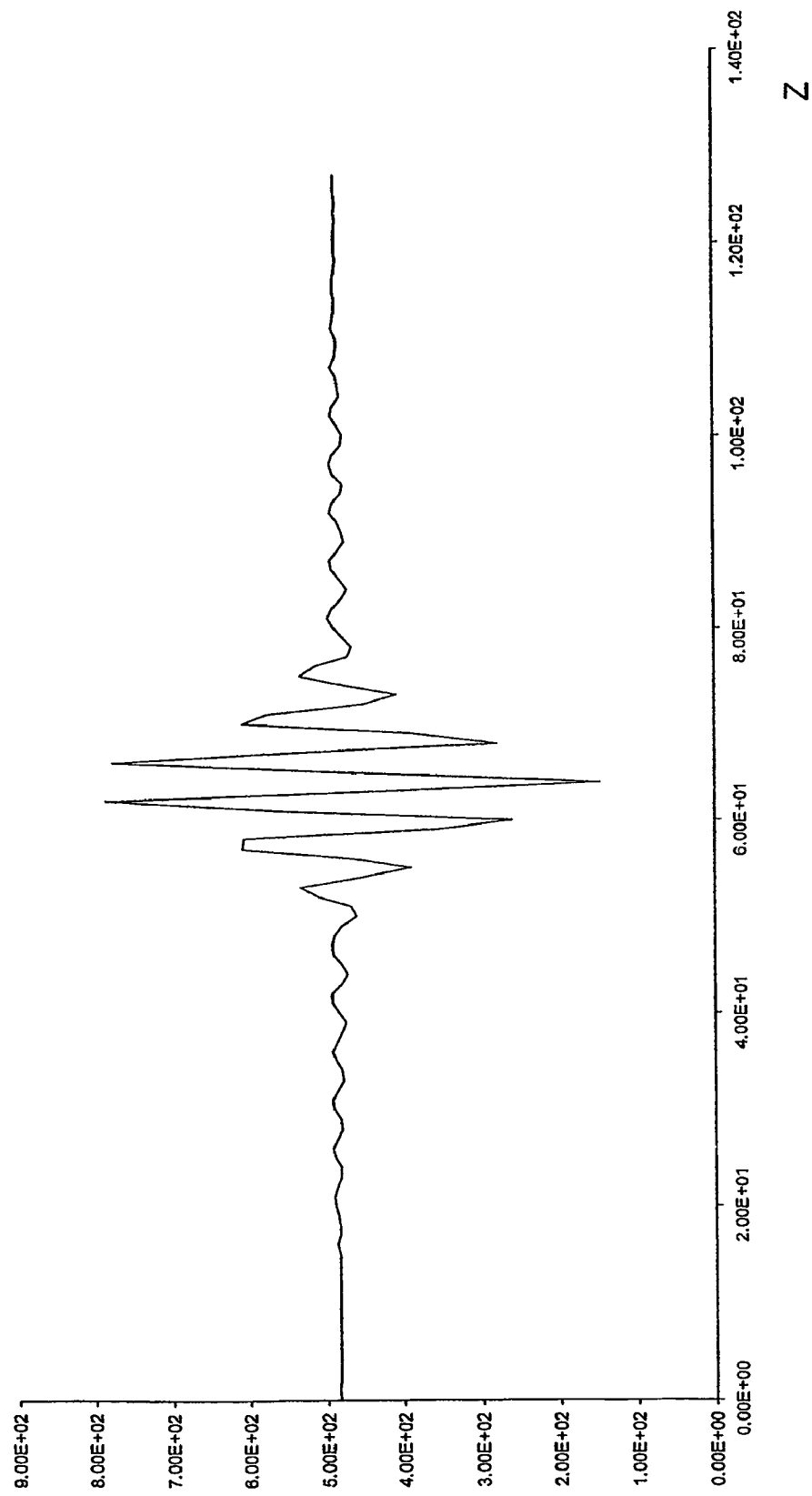
FIG. 2 shows a graph of intensity I against position Z to illustrate a typical example of the interference fringes for a sample surface region around a coherence peak or interference region.

The intensity of the illumination sensed by one sensing element of the 2D sensing array (that is the portion of the interference pattern provided by light reflected from the corresponding surface region or surface pixel of the sample surface 7 imaged on that sensing element) varies as the path length difference changes with movement of the reference mirror 6, resulting in a series of fringes which have a coherence peak at the position along the scan path corresponding to zero path length difference. FIG. 2 shows a graph of light intensity against position Z to illustrate the manner in which the intensity of the light sensed by a sensing element of the 2D sensing array of the detector 10 (and thus the interference fringe region) changes as the relative positions of the reference mirror 6 and sample surface 7 change. The envelope of the intensity distribution is the Fourier transform of the spectral distribution of the broadband source, modified by the spectral transmission of the instrument together with the spectral responsivity of the detector.

Further details of one example of an interferometer system 2 that may be used in the apparatus 1 will now be described with the aid of FIG. 3 which shows an overall functional block diagram of the apparatus 1 and FIG. 4 which shows a simplified side elevational view of the interferometer system 2.

Figure 3:
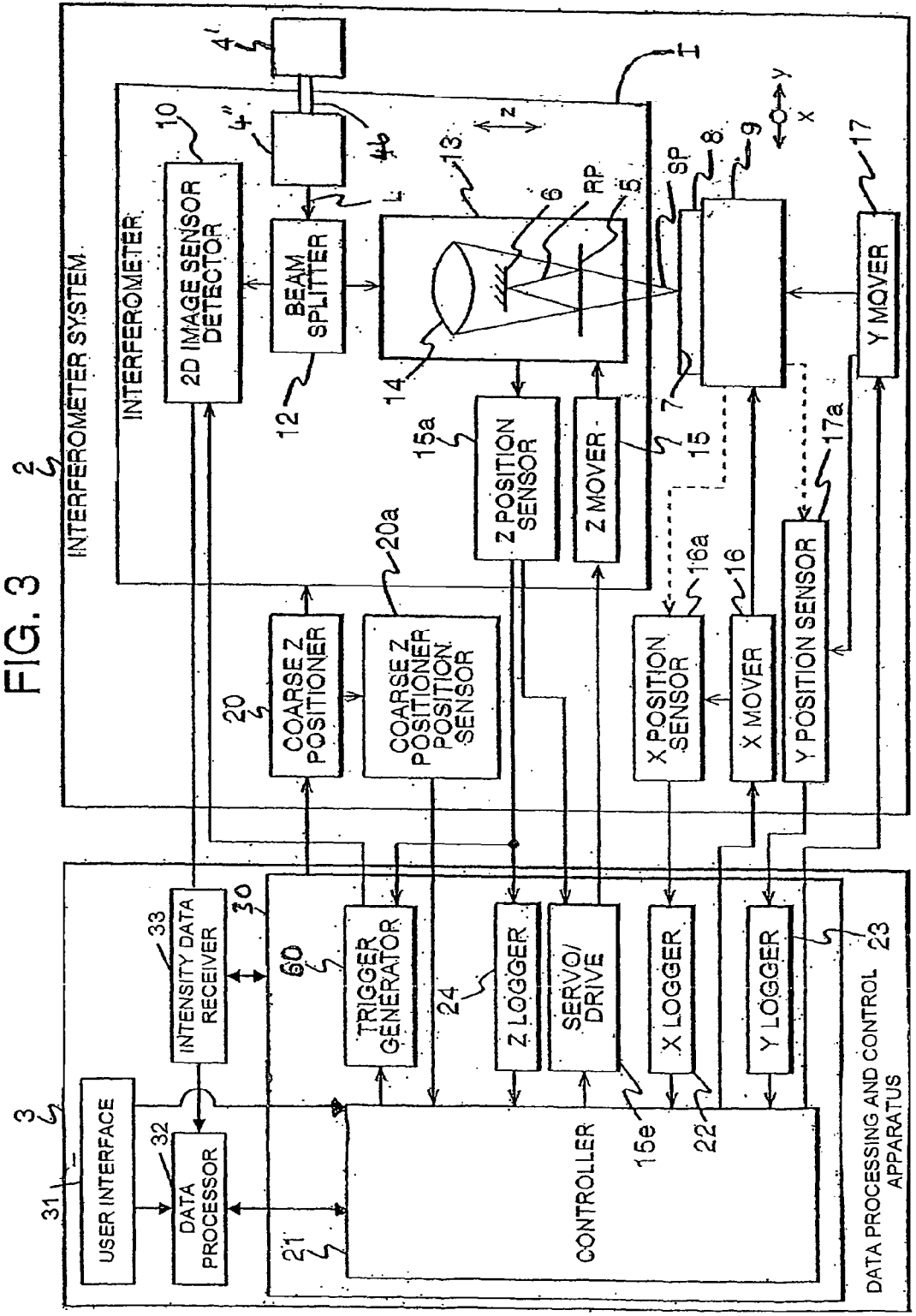
FIG. 3 shows a functional block diagram illustrating in greater detail one example of the apparatus shown in FIG. 1.
Figure 4:
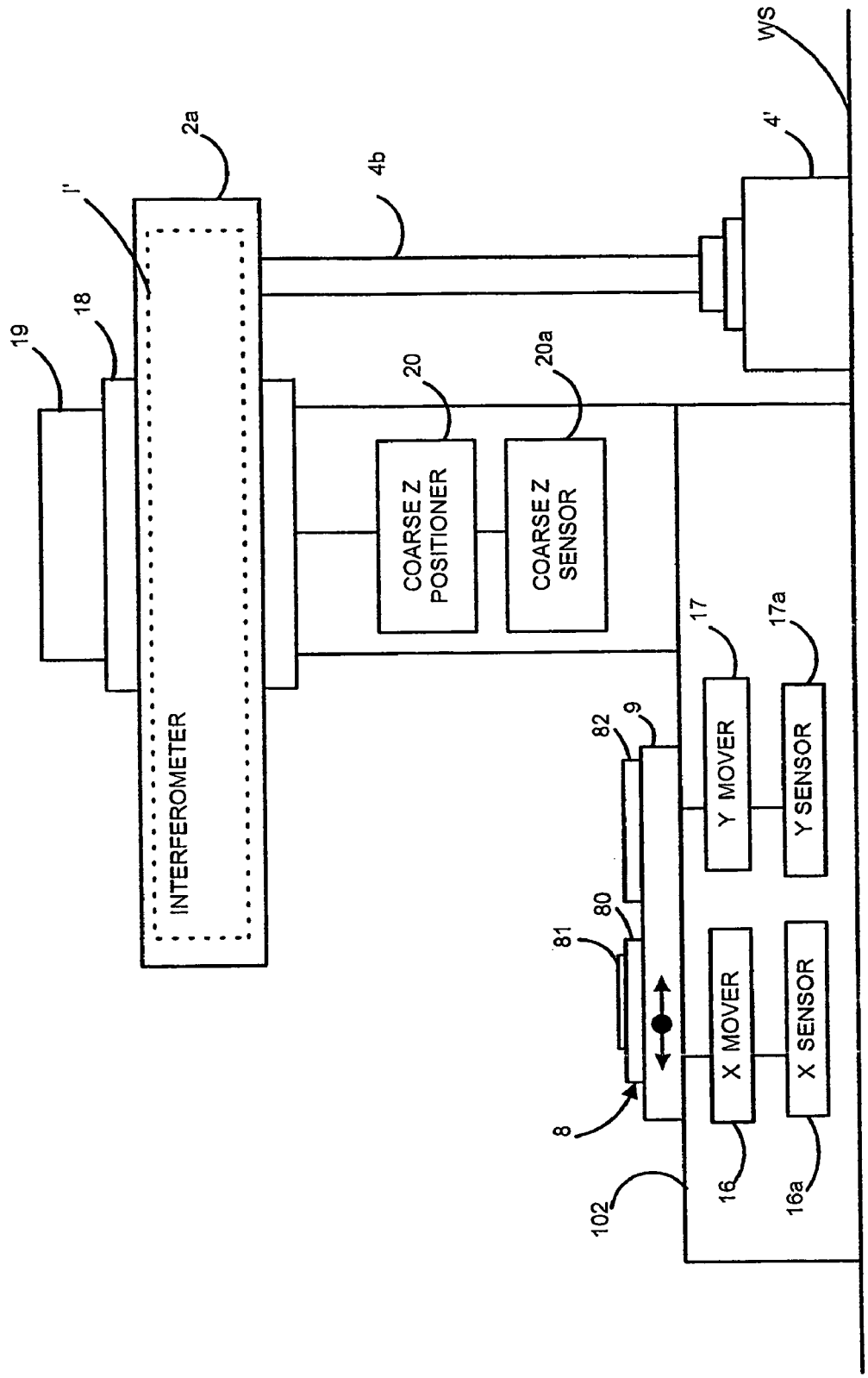
FIG. 4 shows a simplified side-elevational, part sectional view of one example of a suitable interferometer system for use in the apparatus.

In the example shown in FIGS. 3 and 4, the interferometer system 2 is based on a Mirau type interferometer.

As shown in FIG. 3, an interferometer I of the broadband scanning interferometer system 2 has a broadband source 4 having first and second components 4' and 4" optically coupled by an optical fibre cable 4b. The first component 4' houses a quartz halogen projector bulb (with associated reflector). The second component comprises a series of optical elements through which light from the optical fibre cable 4b is transmitted. In this example, the series consists of a diffuser, a changeable filter, an aperture stop, a lens, a field stop and a collimating lens that provides an emergent light beam L. The filter may be a neutral density filter or a band pass filter, designed to restrict the wavelength range of the light emitted by the broadband source 4, such as a Helium-Neon laser line filter designed to pass light having a Helium-Neon laser line wavelength.

The second component 4" of the broadband light source is arranged to supply broadband light L via a beam splitter 12 to an objective lens assembly 13 which includes, in addition to an objective lens 14, the beam splitter 5 and the reference mirror 6. The beam splitter 5 splits the light beam provided by the beam splitter 12 into a first reference beam that is directed along the reference path RP and a second sample beam that is directed along the sample path SP from the interferometer I towards the surface 7 of the sample 8 mounted on the sample support stage 9. Light returned to the beam splitter 12 is reflected towards the detector by the beam splitter and focussed onto the detector 10 by lens 3 (see FIG. 1).

The objective lens assembly 13, and thus the reference mirror 6, is movable in the Z direction by a Z direction mover 15, in this example a piezoelectric mover, under the control of servo/drive circuitry 15e of the control apparatus 30. The sample support stage 9 is movable in X and Y directions by an X mover 16 and a Y mover 17, respectively, to enable different areas of the sample surface 7 to be brought within the field of view of the detector 10.

As shown in FIG. 4, the majority I' of the components of the interferometer I of the broadband scanning interferometer system 2 (apart from first component 4' of the light source and the optical fibre cable 4b) are provided within a housing 2a mounted via a carriage 18 to a Z axis datum column 19. The carriage 18 is coupled via a drive mechanism (not shown) such as a ball screw or lead screw drive mechanism to a coarse Z positioner 20 in the form of a manually operable control or, in this example, a DC motor that enables the carriage 18 and thus the interferometer I to be moved up and down the column 19 in the Z direction to enable the interferometer to be moved to different scanning start positions.

As shown in FIG. 4, the sample support stage 9 is provided on a support 102 which houses the X and Y movers 16 and 17. The X and Y movers 16 and 17 comprise, in this example, DC motors coupled to the sample support stage 9 by appropriate conventional drive mechanisms such as rack and pinion or ball screw drive mechanisms (not shown). As shown in FIGS. 3 and 4, each of the Z, X and Y movers is associated with a corresponding position sensor 15a, 16a and 17a while the coarse Z positioner 20 may be associated with a coarse Z positioner position sensor 20a. The dashed lines between the support stage 9 and the X and Y position sensors 16a and 17a in FIG. 3 indicate that the position sensors may sense movement of the support stage 9 directly, rather than by signals derived from the corresponding motor.

As shown in FIG. 1, the data processing and control apparatus 3 has control apparatus 30 for controlling operation of the interferometer system 2, an intensity data receiver 33 for receiving intensity data signals from the detector 10, a data processor 32 for processing the intensity data under the control of a controller 21 of the control apparatus 30 and a user interface 31 for enabling a user or operator to control operation of apparatus, for enabling the user or operator to be provided with a data output representing the results of processing by the data processor 32 of the data acquired during a measurement operation and also for enabling messages such as error messages to be communicated to the user.

The controller 21 of the control apparatus 30 controls overall operation of the apparatus and communicates with the user interface 31 and data processor 32. The control apparatus 30 also includes, in this example, the servo drive circuitry 15e and X, Y and Z loggers 22,23 and 24, each of which receives the output of the corresponding position sensor 16a, 17a and 15a, and a trigger generator 60 for triggering operation of the detector 10 in response to the output of the Z position sensor 15a to capture images at the required intervals. The controller 21 also receives an output from the coarse Z positioner position sensor 20a, if provided. The controller 21 may be programmed in known manner to compensate for any error in the Z position due to the slight arcuate nature of the motion of the objective lens assembly 13.

Figure 5:
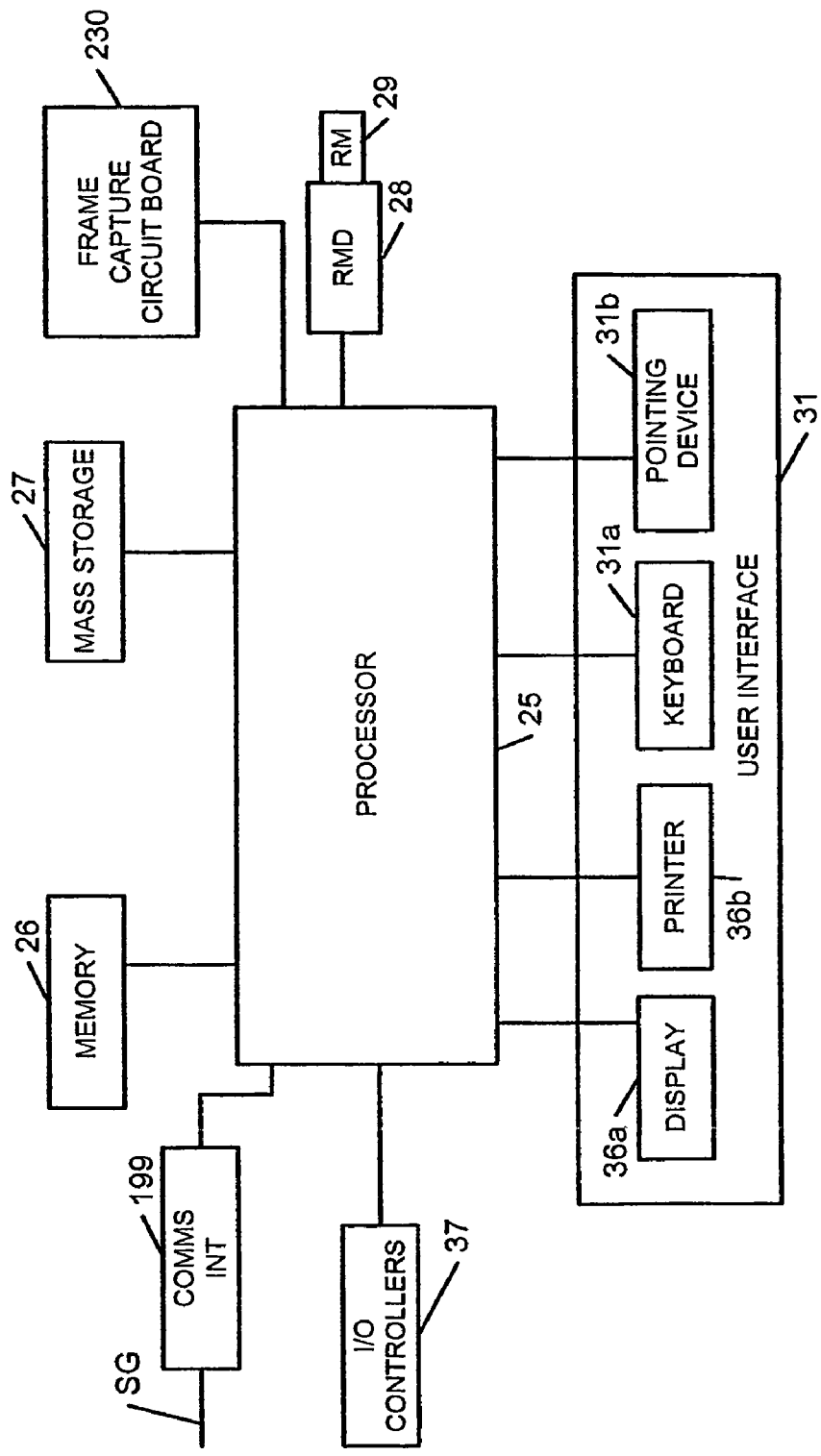
FIG. 5 shows a functional block diagram of computing apparatus that may be configured to provide the data processing and control apparatus shown in FIG. 3.

At least the controller 21 and data processor 32 of the data processing and control apparatus may be implemented by programming computing apparatus, for example a personal computer. FIG. 5 shows a simplified block diagram of such computing apparatus. As shown, the computing apparatus has a processor 25 associated with memory 26 (ROM and/or RAW, a mass storage device 27 such as a hard disk drive, a removable medium drive (RMD) 28 for receiving a removable medium (RM) 29 such as a floppy disk, CDROM, DVD or the like, input and output (I/O) controllers 37 for interfacing with the components of the broadband scanning interferometer system to be controlled by the control apparatus (for example, the Z, X and Y movers 15 to 17, the coarse Z positioner 20 and the detector 10) to enable the processor 25 to control operation of these components. The user interface 31 consists, in this example, of a keyboard 31a, a pointing device 31b, a display such as a CRT or LCD display 36a and a printer 36b. The computing apparatus may also include a communications interface (COMMS INT) 199 such as a modem or network card that enables the computing apparatus to communicate with other computing apparatus over a network such as a local area network (LAN), wide area network (WAN), an Intranet or the Internet. In this example, the intensity data receiver 33 is provided as a dedicated frame capture circuit board 230 installed within the computing apparatus.

The processor 25 may be programmed to provide the data processor 32 and controller 21 by any one or more of the following ways: 1) by pre-installing program instructions and any associated data in a non-volatile portion of the memory 26 or on the mass storage device 27; 2) by downloading program instructions and any associated data from a removable medium 29 received within the removable medium drive 28; 3) by downloading program instructions and any associated data as a signal SG supplied from another computing apparatus via the communications interface 199; and 4) by user input via the user interface 31.

As so far described, the apparatus is similar to that described in the applicant's international application publication number WO03/078925, the whole contents of which are hereby incorporated by reference. Further details of a typical example of the interferometer system 2 and the control apparatus 30 described with reference to FIGS. 3 to 5 may be found in WO03/078925 (our ref 3022799). An example of a commercially available apparatus that may be used is the Talysurf CCI 3000 produced by Taylor Hobson Limited of Leicester, England.

The apparatus 1 described above with reference to FIGS. 1 to 5 differs from that disclosed in WO03/078925 in that it is specifically intended for use in characterising a layer or layer structure. To this end, as shown very diagrammatically and not to scale in FIG. 4, the apparatus enables measurement on a sample 8 comprising a substrate 80 carrying a layer structure 81 in the form of, for example, a thin film layer structure and on a base 82 in the form of a polished substrate of known dispersive refractive index. The base 82 may either be an entirely separate reference sample as shown in FIG. 4, or may be an un-coated region on the substrate 80 itself, provided the dispersive refractive index is known.

In particular, the apparatus 1 enables characteristics of the layer structure such as the dispersive refractive index and layer thickness of each layer of the layer structure to be characterised. In order to achieve this, the data processor 32 comprises, as shown in FIG. 1, a layer structure determiner 100 for determining characteristics of a sample layer structure 81 from the intensity data received by the intensity data receiver 33.

Figure 6:
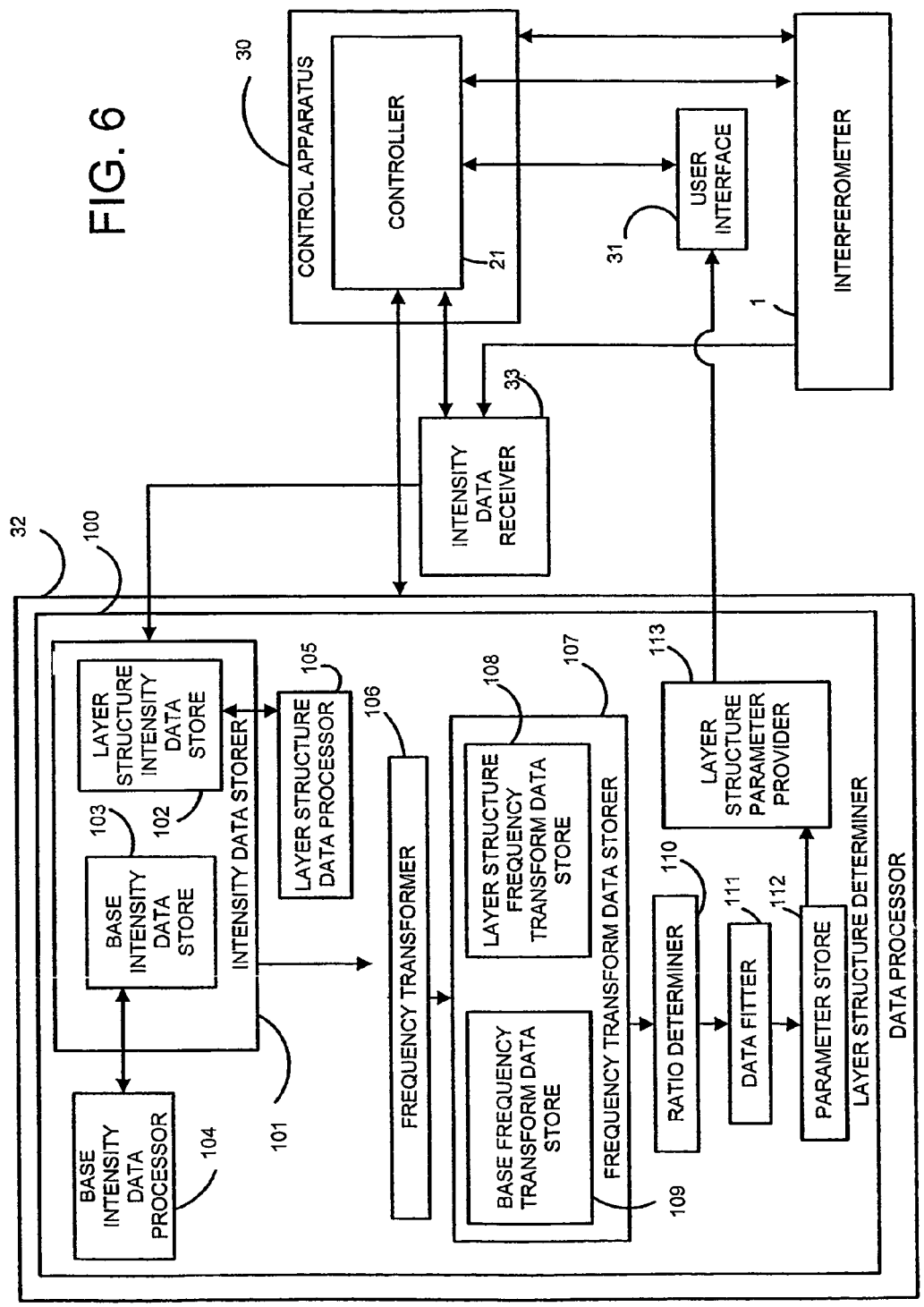
FIG. 6 shows a functional block diagram of the apparatus shown in FIG. 1 illustrating in greater detail a layer structure determiner of a data processor of the data processing and control apparatus.

The operation of the layer structure determiner 100 will now be described with the aid of FIG. 6 which shows a functional block diagram illustrating the functional components of the layer structure determiner 100.

As will be discussed below, in order to enable the apparatus to characterise the layer structure, the user first of all causes the apparatus to conduct in either order: 1) a scan of a surface area of the base 82 so that a set of intensity data is received by the intensity data receiver 33 for that surface area of the base 82 for each scan interval along the scan path; and 2) a scan of a surface area of the layer structure 81 so that a set of intensity data is received by the intensity data receiver 33 for that surface area of the layer structure 81 for each scan interval along the scan path. As mentioned above, the stage 9 is arranged to enable X and Y movement. Although not shown, as in the case of the Talysurf CCI 3000, the stage 9 will also be tiltable about the Z axis to enable the user to ensure that the sample surface is parallel to the reference mirror 6. Prior to both measurements, the tip-tilt stage 9 is adjusted to produce near-minimum fringe densities, so ensuring that the thin film 81 region of interest and the base 82 are substantially parallel to the reference mirror. There is no requirement for the base 82 and the substrate 80 with the thin film structure 81 to have the same thickness. It is, however, important to ensure that the light source is constant for both measurements.

The intensity data received by the intensity data receiver 33 has, for a typical location z within the interference pattern, an intensity $I(\overline{z})$ given by the squared modulus of the electric field due to the light from the reference and sample as set out in equation 1 below:

$$I(\overline{z}) = |E_R(0) + E_S(\overline{z})|^2 \quad \quad 1)$$

where $E_R(0)$ is the electric field component resulting from light reflected from the reference, $E_S(\overline{z})$ is the electric field component resulting from light reflected from the sample and $\overline{z}$ is the average path length difference over the numerical aperture of the sensing element of the detector 10.

The right-hand side of equation 1) is equivalent to $$\int_0^\infty |\overline{A_R}(v)e^{i\varphi_R(v)} + \overline{A_S}(v)e^{i\varphi_S(v)}e^{i2\pi v\overline{z}}|^2 \, dv \quad \quad 2)$$

where the subscripts R and S represent the reference and sample, respectively, $\overline{A_R}(v)$ and $\overline{A_S}(v)$ are the average amplitudes over the numerical aperture of the sensing element SE of the detector 10 at the frequency v for the reference and sample arm, respectively, and $$e^{i\varphi_R(v)} \text{ and } e^{i\varphi_S(v)}$$

represent the phase of the reference and sample beams, respectively, at that frequency v.

Bearing in mind that $|a+b|^2 = (a+b)(a^*+b^*)$ where * represents the complex conjugate and that $\cos(a) = \cos(-a)$ and $\sin(a) = -\sin(-a)$, expanding equation 2) gives:

$$I(\overline{z}) = \int_0^\infty \overline{A_R^2}(v) \, dv + \int_0^\infty \overline{A_S^2}(v) \, dv + \quad \quad 3)$$

$$2\int_0^\infty \overline{A_R}(v)\overline{A_S}(v)\cos(\varphi_S - \varphi_R + 2\pi v\overline{z}) \, dv$$

Thus, as can be seen from equation 3, the intensity data I ($\overline{z}$) for a given location in the interference pattern comprises a DC or non-varying component represented by the first two terms in equation 3 and an AC or varying component represented by the last term in equation 3. It is the AC or varying component that provides the interference pattern.

The sets or frames of intensity data received by the intensity data receiver 33 are supplied under the control of the controller 21 to an intensity data storer 101 of the layer structure determiner 100. The intensity data storer 101 is arranged, under the control of the controller 21, to store layer intensity data for the layer structure 81 in a layer structure intensity data store 102 and to store base intensity data for the base 82 in a base intensity data store 103. As shown, respective base and layer structure intensity data processors 104 and 105 may be provided to process the base and layer structure intensity data, respectively prior to its further use by the layer structure determiner 100, for example the intensity data processors may be provided to average the intensity data over a number of adjacent surface pixels to provide, for each surface pixel, average intensity data to improve the signal-to-noise ratio.

When the scan of the surface area of the base 82 and the scan of the surface area of the layer structure 81 have been completed, then the base and layer structure intensity data stores 103 and 102 will each store, for each surface pixel of the corresponding scanned surface area, a series of intensity data values, one from each frame of data acquired during the scan.

The layer structure determiner 100 is arranged to process the stored intensity data for one surface pixel at a time or alternatively, to improve the signal-to-noise ratio, to initially average the intensity data corresponding to a set of adjacent pixels and then to process the averaged intensity data instead of the actual intensity data.

Now assuming that the amplitude is symmetric, that is: $A_R(-v) = A_R(v)$, defining the phase difference between the sample and reference light beams as $\Delta\phi = \phi_S - \phi_R$, and assuming that, since AC is real, $\Delta\phi(-v) = -\Delta\phi(v)$ then, from equation 3, the AC component is $$AC(\overline{z}) = 2\int_0^\infty \overline{A_R}(v)\overline{A_S}(v)\cos(\varphi_S - \varphi_R + 2\pi v\overline{z}) \, dv \quad \quad 4)$$

$$= \int_{-\infty}^\infty \overline{A_R}(v)\overline{A_S}(v)\cos(\Delta\varphi + 2\pi v\overline{z}) \, dv$$

which, bearing in mind that $\cos a=(e^{ia}+e^{-ia})/2$, gives $$2AC(\bar{z}) = \int_{-\infty}^{\infty} \overline{A_R}(v)\overline{A_S}(v)e^{i\Delta\varphi(v)}e^{i2\pi v\bar{z}}dv + \int_{-\infty}^{\infty} \overline{A_R}(v)\overline{A_S}(v)e^{-i\Delta\varphi(v)}e^{-i2\pi v\bar{z}}dv \quad 5)$$

Now for both integrals the amplitude is localised around $\pm v_o$, where $$v_o = \frac{\int_0^{\infty} \overline{A_R}(v)\overline{A_S}(v)v\,dv}{\int_0^{\infty} \overline{A_R}(v)\overline{A_S}(v)dv} \quad 6)$$

so they may be divided:

$$2AC(\bar{z}) = \int_{-\infty}^{\infty} \overline{A_R^o}(v-v_o)\overline{A_S^o}(v-v_o)e^{+i\Delta\varphi^o(v-v_o)}e^{+i2\pi v\bar{z}}dv + \quad 7)$$
$$\int_{-\infty}^{\infty} \overline{A_R^o}(v+v_o)\overline{A_S^o}(v+v_o)e^{+i\Delta\varphi^o(v+v_o)}e^{+i2\pi v\bar{z}}dv +$$
$$\int_{-\infty}^{\infty} \overline{A_R^o}(v-v_o)\overline{A_S^o}(v-v_o)e^{-i\Delta\varphi^o(v-v_o)}e^{-i2\pi v\bar{z}}dv +$$
$$\int_{-\infty}^{\infty} \overline{A_R^o}(v+v_o)\overline{A_S^o}(v+v_o)e^{-i\Delta\varphi^o(v+v_o)}e^{-i2\pi v\bar{z}}dv$$
$$= (e^{+i2\pi v_o\bar{z}}+e^{-i2\pi v_o\bar{z}})\begin{pmatrix} \mathcal{F}\left(\overline{A_R^o}(v)\overline{A_S^o}(v)e^{+i\Delta\varphi^o(v)}\right) + \\ \mathcal{F}^{-1}\left(\overline{A_R^o}(v)\overline{A_S^o}(v)e^{-i\Delta\varphi^o(v)}\right) \end{pmatrix}$$

Here advantage has been taken of the fact that the spectral functions may be re-expressed in terms of a set of functions, $\overline{A_R^o}(v)$, $\overline{A_S^o}(v)$, $\Delta^o\phi(v)$ which are identical to $\overline{A_R}(v)$, $\overline{A_S}(v)$, $\Delta\phi(v)$ apart from the fact that they are centred about zero.

Re-expressing $AC(\bar{z})$:

$$AC(\bar{z}) = \cos 2\pi v_o\bar{z} \begin{pmatrix} \mathcal{F}\left(\overline{A_R^o}(v)\overline{A_S^o}(v)e^{+i\Delta\varphi^o(v)}\right) + \\ \mathcal{F}^{-1}\left(\overline{A_R^o}(v)\overline{A_S^o}(v)e^{-i\Delta\varphi^o(v)}\right) \end{pmatrix} \quad 8)$$
$$= \cos(2\pi v_o(Z_k+2\overline{\Delta z}))\begin{pmatrix} \mathcal{F}\left(\overline{A_R^o}(v)\overline{A_S^o}(v)e^{+i\Delta\varphi^o(v)}\right) + \\ \left(\mathcal{F}^{-1}\overline{A_R^o}(v)\overline{A_S^o}(v)e^{-i\Delta\varphi^o(v)}\right) \end{pmatrix}$$

where the path difference between the sample and reference beams, $\bar{z}$, has been re-written as $$\bar{z}=\overline{Z_k}+2\overline{\Delta z} \quad 9)$$

where $\overline{\Delta z}$ is the difference between the Z position of the reference and the closest step of the scan, $\overline{Z_k}$ is the net path length displacement of the sample corresponding to the $k^{th}$ step ($=2k\overline{\Delta z_{step}}$) and the over line indicates that the value is integrated over the numerical aperture of the sensing element SE of the detector.

This expression shows that the envelope of the AC component, that is the correlation, is given by the real component of the Fourier transform $$\mathcal{F}\left(\overline{A_R^o}(v)\overline{A_S^o}(v)e^{i\Delta^o\varphi(v)}\right).$$

Concentrating on this correlation term, since, generally $\Im(AB)=\Im(A)\otimes\Im(B)$ (where $\otimes$ represents the convolution symbol), the Fourier transform of $AC(\bar{z})$ is given by the convolution $$\mathcal{F}(AC) = e^{-i4\pi v\overline{\Delta z}}\frac{\delta(v-v_o)+\delta(v+v_o)}{2} \otimes \quad 10)$$
$$\mathcal{F}\begin{pmatrix} \mathcal{F}\left(\overline{A_R^o}(v)\overline{A_S^o}(v)e^{+i\Delta\varphi^o(v)}\right) + \\ \mathcal{F}^{-1}\left(\overline{A_R^o}(v)\overline{A_S^o}(v)e^{-i\Delta\varphi^o(v)}\right) \end{pmatrix}$$
$$= e^{-i4\pi v\overline{\Delta z}}\begin{pmatrix} \delta(v-v_o)+ \\ \delta(v+v_o) \end{pmatrix} \otimes \overline{A_R^o}(v)\overline{A_S^o}(v)e^{-i\Delta\varphi^o(v)}$$

where the fact that $$\mathcal{F}\left(\overline{A_R^o}(v)\overline{A_S^o}(v)e^{+i\Delta\varphi^o(v)}\right)$$

is the conjugate of $$\mathcal{F}^{-1}\left(\overline{A_R^o}(v)\overline{A_S^o}(v)e^{-i\Delta\varphi^o(v)}\right)$$

has been used. This shows that $\Im(AC(\overline{Z_k}))$ consists of sidebands centred about $\pm v_o$. If the suffix 'SB+' implies the positive-arm sideband, then from equations 3, 4 and 10, the important identity is obtained:

$$\Im(I(\overline{Z_k}))_{SB+}=\Im(AC(\overline{Z_k}))_{SB+}=e^{-i4\pi v\overline{\Delta z}}\overline{A_R}(v)\overline{A_S}(v)e^{-i\Delta\varphi(v)} \quad 11)$$

Given also that $$\overline{Z_k}=Z_k\cos\theta_o \quad 12)$$

where, for uniform illumination, $$\cos\theta_o = \frac{\int_{\theta_{min}}^{\theta_{max}}\theta\cos\theta\,d\theta}{\int_{\theta_{min}}^{\theta_{max}}\theta\,d\theta} \quad 13)$$
$$= 2\left(\frac{\theta_{max}\sin\theta_{max}+\cos\theta_{max}-\theta_{min}\sin\theta_{min}-\cos\theta_{min}}{\theta_{max}^2-\theta_{min}^2}\right)$$

where $\theta_{min}$ and $\theta_{max}$ are the minimum and maximum angles of incidence accepted by the numerical aperture and $\theta_{min}$ will be zero in the case of a Michelson interferometer.

Equations 3, 4, 9, 11 and 12 thus relate the intensity for a surface pixel in a scan to the average amplitude of the reference and sample light beams and the phase difference between the sample and reference light beams, as a function of frequency v. Equations 12 and 13 show that for low numerical aperture objectives, $\overline{Z_k}$ is well approximated by $Z_k$.

In the case of a low numerical aperture objective, the intensity data $I(Z_k)$ stored by the intensity data storer 101 is supplied, under the control of controller 21, to a frequency transformer 106 that carries out frequency transformation process to provide frequency transformed intensity data. In this example, the frequency transformation is a Fourier transformation process and the frequency transformer is arranged to carry out a Fast Fourier Transform (FFT) procedure. The well-known ($2^n$) FFT may be used, although other forms of Fourier transform such as the Winograd Fourier transform (which is not based on powers of 2) could be used.

In the case of a Fourier transformation, the frequency transformed intensity data is related to the intensity function as follows:

$$\mathcal{F}(I(Z_k)) = \int_{-\infty}^{\infty} I(Z_k) e^{i2\pi v Z_k} dZ_k \qquad (14)$$

A frequency transform data storer 107 is provided to store the frequency transform data under the control of the controller 21 so that layer structure frequency transform intensity data is stored in a layer structure frequency transform data store 108 and base frequency transform intensity data is stored in a base frequency transform data store 109.

A ratio determiner 110 of the layer structure determiner 100 is provided to determine, under the control of the controller 21, the ratio between the positive frequency space sidebands of the Fourier transforms $\Im(I_{thin}(Z_k))_{SB+}$ and $\Im(I_{base}(Z_k))_{SB+}$ of the intensity data (if both transforms exceed a threshold, typically set at 5% of their maximum value) for the layer structure 81 and the base 82, respectively, multiplied by a field reflectance term to provide a normalised HCF(υ) ratio. The field reflectance term consists of the difference between the dispersive refractive index of free space (set at 1) and the dispersive refractive index $n_{base}(υ)$ of the base 82 divided by the sum of the dispersive refractive index of free space and the dispersive refractive index of the base 82. The base 82 dispersive refractive index is known by the ratio determiner 110 or provided to the ratio determiner 110 by the user. The ratio determiner 110 can thus calculate the normalised HCF(υ) ratio:

$$HCF(v) = \left(\frac{1 - n_{base}(v)}{1 + n_{base}(v)}\right)^* \frac{\mathcal{F}_{thin}(I(Z_k))_{SB+}}{\mathcal{F}_{base}(I(Z_k))_{SB+}} \qquad (15a)$$

where * indicates the complex conjugate of the bracketed n base ratio. Where the base 82 is non-absorbing, then the bracketed n base ratio will be real and its complex conjugate will be the same. In the interests of generality, however, the reference to the complex conjugate has been retained throughout this description.

If the threshold is not reached, then the controller will cause the display to display a message to prompt the user to increase the light level, avoiding saturation, and then to repeat the measurement operations on both the base 82 and the layer structure 81 using the new light level. If the threshold is still not reached and the light level cannot be further increased, then the controller will cause the display to display a message to advise the user that that particular sample cannot be measured.

The normalised HCF ratio is, under the control of the controller 21, passed to a data fitter 111 that sets the calculated normalised HCF ratio equal to an optical admittance ratio term, E(v):

$$E(v) = r^*(v)e^{-i4\pi v \Delta z_{HCF}} = \left(\frac{1 - Y^*(v)}{1 + Y^*(v)}\right)e^{-i4\pi v \Delta z_{HCF}} \qquad (16a)$$

in which * indicates the complex conjugate, r is the electrical field reflectance from the layer structure 81, Y is the optical admittance of the layer structure 81 (which, as will be explained below, is dependent upon the following parameters: the number of layers in the layer structure 81, the thickness of each layer in the layer structure 81 and the dispersive refractive index of each layer in the layer structure 81), and the exponent is a helical phase term, the derivation of which will be explained below.

For larger numerical aperture objectives, where sin θ may no longer be approximated by θ, then the HCF ratio (equation 15a) becomes:

$$HCF(v) \equiv a_{HCF}(v) e^{i\varphi_{HCF}(v)} \qquad (15b)$$

$$= \frac{1}{2} \int_0^{\pi/2} \left( \frac{1 - \eta_{base}^p(v,\theta)\cos\theta}{1 + \eta_{base}^p(v,\theta)\cos\theta} + \frac{1 - \eta_{base}^s(v,\theta)/\cos\theta}{1 + \eta_{base}^s(v,\theta)/\cos\theta} \right) w(\theta) d\theta \frac{\mathcal{F}_{thin}(I(z_i))_{SB+}}{\mathcal{F}_{base}(I(z_i))_{SB+}}$$

$$\approx \overline{r(v)e^{-i\varphi(v)}} e^{-i4\pi v \Delta z_{HCF} \cos\theta_o}$$

$$\equiv E(v)$$

where $$\eta_{base}^s = n_{base}(v)\sqrt{1 - \sin^2\theta_o / n_{base}(v)} \qquad (17)$$
$$\eta_{base}^p = n_{base}(v)\sqrt{1 - \sin^2\theta_o / n_{base}(v)}$$

* indicates the complex conjugate and the optical admittance ratio term, E(v), (equation 16a) becomes:

$$E(v) \equiv a_E(v) e^{i\varphi_E(v)} \qquad (16b)$$

$$= \frac{1}{2} \int_0^{\pi/2} \left( \frac{1 - Y_p^*(v,\theta)\cos\theta}{1 + Y_p^*(v,\theta)\cos\theta} + \frac{1 - Y_s^*(v,\theta)/\cos\theta}{1 + Y_s^*(v,\theta)/\cos\theta} \right) e^{-i4\pi v \Delta z_{HCF}\cos\theta} w(\theta) d\theta$$

where the subscripts p and s refer respectively to the p-plane and s-plane polarisations.

The data fitter 111 then uses a thin film optimisation approach to extract the dispersive refractive index and thickness for each layer of the layer structure 81.

The derivation of the normalised HCF ratio and the reason why the data fitter 111 can use a thin film optimisation approach to extract the dispersive refractive index and thickness using the normalised HCF ratio of equation 15a (or 15b for larger numerical aperture) will now be explained.

Considering first the passage of the component of incident light that is polarised in a direction defined as the x-axis, through the objective, reflected off the sample and returning through the objective, then the resultant field-reflectance is given by:

$$\overline{re^{i\varphi}} = \frac{1}{\theta_{max}^2 - \theta_{min}^2} \int_{\theta_{min}}^{\theta_{max}} \int_0^{\pi/2} \theta \begin{pmatrix} r_s(\theta)e^{i\varphi_s(\theta)}\cos\rho + \\ r_p(\theta)e^{i\varphi_p(\theta)}\sin\rho \end{pmatrix} d\rho d\theta \quad 18)$$

$$= \frac{2}{\theta_{max}^2 - \theta_{min}^2} \int_{\theta_{min}}^{\theta_{max}} \frac{r_s(\theta)e^{i\varphi_s(\theta)} + r_p(\theta)e^{i\varphi_p(\theta)}}{2} \theta d\theta$$

$$= \frac{1}{\theta_{max}^2 - \theta_{min}^2} \int_{\theta_{min}}^{\theta_{max}} \sqrt{r_s^2 + r_p^2 + 2r_s r_p \cos\Delta\varphi}\; e^{i\zeta} d\theta$$

where $$\zeta = \tan^{-1}\left(\frac{r_s\sin\varphi_s + r_p\sin\varphi_p}{r_s\cos\varphi_s + r_p\sin\varphi_p}\right) \quad 19)$$

The amplitude reflectance is therefore independent of the incident entrance pupil Cartesian polarisation component. In this pupil plane, radial and circumferential polarisation states correspond respectively to the measurands p and s-polarisation states.

Equation 11 above defines the interference intensity function in terms of the average amplitude of the reference and sample light beams and the phase difference between the sample and reference light beams, as a function of frequency υ.

A reasonable scalar approximation for equation 11 is:

$$\mathcal{F}(I(\overline{Z_k}))_{SB+} = e^{-i4\pi v\Delta z}\overline{A_R}(v)\overline{A_S}(v)e^{-i\Delta\varphi(v)} \quad 20)$$

$$\simeq \left(\frac{a(v)}{\theta_{max}^2 - \theta_{min}^2}\right)^2 \int_{\theta_{min}}^{\theta_{max}} \begin{pmatrix} a_{s_s}(v,\theta)e^{-i\varphi_{s_s}(v,\theta)} + \\ a_{s_p}(v,\theta)e^{-i\varphi_{s_p}(v,\theta)} \end{pmatrix} e^{-i4\pi v\Delta z\cos\theta}\theta d\theta \cdot$$

$$\int_{\theta_{min}}^{\theta_{max}} \left(a_{R_s}(v,\theta)e^{i\varphi_{R_s}(v,\theta)} + a_{R_p}(v,\theta)e^{i\varphi_{R_p}(v,\theta)}\right)\theta d\theta$$

where $a_S(v,\theta)$ is the amplitude at frequency υ and angle θ and where $a(v)$ represents the product of the source spectral emission, the system spectral transmission (excluding the interference objective, reference mirror and sample) and the detector spectral responsivity.

The integral terms in equation 20 for the reference arm can be represented simply as an amplitude component and a phase component, that is a complex function of the form $\Omega(\phi)\cdot e^{i\sigma(\Phi)}$, while, in accordance with thin film theory, the integral terms in equation 20 for the sample arm can be represented as an amplitude transmission component, a corresponding phase component and an optical admittance component that represents the amplitude reflectance of the thin film layer structure, that is equation 20 can be represented as:

$$A = \frac{a(v)}{\theta_{max}^2 - \theta_{min}^2} \int_{\theta_{min}}^{\theta_{max}} \begin{pmatrix} \frac{1 - Y_s^*(v,\theta)/\cos\theta}{1 + Y_s^*(v,\theta)/\cos\theta} t_s(v,\theta)e^{-i\varphi_{\tau_s}(v,\theta)} + \\ \frac{1 - Y_p^*(v,\theta)\cos\theta}{1 + Y_p^*(v,\theta)\cos\theta} t_p(v,\theta)e^{-i\varphi_{\tau_p}(v,\theta)} \end{pmatrix} e^{-i4\pi v\Delta z\cos\theta}\theta d\theta \quad 21)$$

$$= \frac{a(v)}{\theta_{max}^2 - \theta_{min}^2} \int_{\theta_{min}}^{\theta_{max}} \begin{pmatrix} \frac{1 - Y_s(v,\theta)/\cos\theta}{1 + Y_s(v,\theta)/\cos\theta} + \\ \frac{1 - Y_p(v,\theta)\cos\theta}{1 + Y_p(v,\theta)\cos\theta} \end{pmatrix}^* t(v,\theta)e^{-i\varphi_\tau(v,\theta)}e^{-i4\pi v\Delta z\cos\theta}\theta d\theta$$

$$B = a(v)\Omega(v)e^{i\sigma(v)} \quad 22)$$

where $\Omega(\upsilon)$ is the amplitude component for the reference beam, $e^{i\sigma(\upsilon)}$ is the phase component for the reference beam, $t_s(v,\theta)$, $t_p(v,\theta)$ and $t(v,\theta)$ are the s-plane beam-splitter transmission amplitude, the p-plane beam-splitter transmission amplitude and the mean beam-splitter transmission amplitude, respectively, at frequency v and angle θ, $\phi_{T_s}(v,\theta)$, $\phi_{T_p}(v,\theta)$ and $\phi_T(v,\theta)$ are the s-plane beam-splitter transmission phase, the p-plane beam-splitter transmission phase and the mean beam-splitter transmission phase, respectively, at frequency v and angle θ, the bracketed terms are the optical admittance components, Y is the optical admittance due to a series of thin film layers where the optical admittance is defined as H/E and, in the case of a medium, is related to its dispersive refractive index N by y=NY where in Gaussian units Y is unity or in SI units y is expressed in units of Y, that is in free space units as explained on page 47 in the 'summary of important results' of Chapter 2 of 'Thin-Film Optical Filters' by H Angus Macleod (ISBN 0 7503 0688 2).

In accordance with equation 2.96 on page 49 in the aforementioned 'summary of important results' of Chapter 2 of 'Thin-Film Optical Filters' by H Angus Macleod, the optical admittance Y is given by:

$$\begin{pmatrix} E \\ H \end{pmatrix} = \prod_{i=1}^{N} \begin{pmatrix} \cos\delta_i & \frac{i}{\eta_i}\sin\delta_i \\ i\eta_i\sin\delta_i & \cos\delta_i \end{pmatrix} \begin{pmatrix} 1 \\ \eta \end{pmatrix} Y = H/E \quad 23)$$

where $$\theta_s = \sin^{-1}\left(\frac{1}{n_s}\sin\theta\right) \quad 24)$$

$$\theta_i = \sin^{-1}\left(\frac{1}{n_i}\sin\theta\right)$$

$$\delta_i = 2\pi v n_i d_i \cos\theta_i$$

N is the number of layers in the thin film structure, $n_s$ is the dispersive refractive index of the substrate 80 of the layer structure, $n_i$ is the dispersive refractive index of the $i^{th}$ thin film layer, $\theta_i$ is the wavefront transmission angle within the $i^{th}$ thin film layer, $\theta_s$ is the wavefront transmission angle within the substrate, and $d_i$ is the thickness of the $i^{th}$ thin film layer. For the p polarisation:

$$\eta_i = \frac{n_i}{\cos\theta_i} Y \text{ and } \eta_s = \frac{n_s}{\cos\theta_s} Y$$

and for the s polarisation:

$\eta_i = n \cos\theta_i Y$ and $\eta_s = n \cos\theta_s Y$.

It is evident from equation 22 that the approximation (in line 2 of equation 22) regarding $t_s(v,\theta)$, $t_p(v,\theta)$, $t(v,\theta)$ and their corresponding phases $\phi_{T_s}(v,\theta)$, $\phi_{T_p}(v,\theta)$, $\phi_T(v,\theta)$ may be avoided if the thin film structure of the beam-splitter is known.

Using equations 21 and 22, equation 20 becomes:

$$\mathcal{F}(I(\overline{Z_k}))_{SB+} = \qquad 25)$$

$$\Omega(v)e^{i\sigma(v)}\frac{a^2(v)}{\theta_{max}^2 - \theta_{min}^2}\int_{\theta_{min}}^{\theta_{max}}\left(\frac{1-Y_s(v,\theta)/\cos\theta}{1+Y_s(v,\theta)/\cos\theta} + \frac{1-Y_p(v,\theta)\cos\theta}{1+Y_p(v,\theta)\cos\theta}\right)^*$$

$$t(v,\theta)e^{-i(\varphi_T(v,\theta)+4\pi v\Delta z\cos\theta)}\theta d\theta$$

For a small numerical aperture $\sin\theta$ is approximately $\theta$, and thus for the layer structure 81 equation 25 collapses to $$\mathcal{F}_{thin}(I(Z_k))_{SB+} \approx \Omega(v)a^2(v)e^{i\sigma(v)}\left(\frac{1-Y(v)}{1+Y(v)}\right)^* t(v)e^{-i(\varphi_T(v)+4\pi v\Delta z)} \qquad 26)$$

By analogy, for the base 82, equation 26 becomes:

$$\mathcal{F}_{base}(I(Z_k))_{SB+} \approx \Omega(v)a^2(v)e^{i\sigma(v)}\left(\frac{1-n_{base}(v)}{1+n_{base}(v)}\right)^* t(v)e^{-i(\varphi_T(v)+4\pi v\Delta z_{base})} \qquad 27)$$

where $n_{base}$ is the dispersive refractive index of the base 82.

The ratio, $\xi(v)$, between the Fourier relationships for the layer structure 81 and the base 82 is:

$$\xi(v) \equiv \mathcal{F}_{thin}(I(Z_k))_{SB+}/\mathcal{F}_{base}(I(Z_k))_{SB+} \qquad 28)$$

$$\approx \left(\frac{1+n_{base}(v)}{1-n_{base}(v)}\right)^*\left(\frac{1-Y(v)}{1+Y(v)}\right)^* e^{-i4\pi v(\Delta z - \Delta z_{base})}$$

$$\simeq \left(\frac{1+n_{base}(v)}{1-n_{base}(v)}\right)^* r(v)e^{-i(\varphi(v)+4\pi v(\Delta z - \Delta z_{base}))}$$

where * represents the complex conjugate

Normalising by dividing by the bracketed inverse reference field reflectance term, gives the normalised $HCF(v)$ ratio. Defining $\Delta z_{HCF} = \Delta z - \Delta z_{base}$, then:

$$HCF(v) \equiv a_{HCF}(v)e^{i\varphi_{HCF}(v)} \qquad 29)$$

$$= \left(\frac{1-n_{base}(v)}{1+n_{base}(v)}\right)^* \frac{\mathcal{F}_{thin}(I(Z_k))_{SB+}}{\mathcal{F}_{base}(I(Z_k))_{SB+}}$$

$$= r(v)e^{-i(\varphi(v)+4\pi v(\Delta z - \Delta z_{base}))}$$

$$= r(v)e^{-i\varphi(v)}e^{-i4\pi v\Delta z_{HCF}}$$

$$\equiv E(v)$$

where $$E(v) \equiv a_E(v)e^{i\varphi_E(v)} = \left(\frac{1-Y^*(v)}{1+Y^*(v)}\right)e^{-i4\pi v\Delta z_{HCF}} \qquad 30)$$

The helical rotary structure of the HCF function is more apparent if it is expressed in the form of a column vector, the real and imaginary components being respectively at the top and bottom $$HCF(v) = \begin{pmatrix} \text{Re}(HCF(v)) \\ \text{Im}(HCF(v)) \end{pmatrix} \qquad 31)$$

$$= r(v)\begin{pmatrix} \cos v4\pi v\Delta z_{HCF} & \sin v4\pi v\Delta z_{HCF} \\ -\sin v4\pi v\Delta z_{HCF} & \cos v4\pi v\Delta z_{HCF} \end{pmatrix}\begin{pmatrix} \cos\varphi(v) \\ -\sin\varphi(v) \end{pmatrix}$$

If the numerical aperture is sufficiently large that $\sin\theta$ may not be approximated by $\theta$, then, referring to equation 25, a reasonable approximation is obtained by assuming that $$\Omega_s(v)e^{i\sigma_s(v)} \approx \Omega_p(v)e^{i\sigma_p(v)}, t_s(v,\theta)e^{-i\varphi_{T_s}(v,\theta)} \approx t_p(v,\theta)e^{-i\varphi_{T_p}(v,\theta)};$$

following the same arguments as in equations 27, 28 and 29 then provides $$HCF(v) \equiv a_{HCF}(v)e^{i\varphi_{HCF}(v)} \qquad 32)$$

$$= \frac{1}{2}\int_0^{\pi/2}\left(\frac{1-\eta_{base}^p(v,\theta)\cos\theta}{1+\eta_{base}^p(v,\theta)\cos\theta} + \frac{1-\eta_{base}^s(v,\theta)/\cos\theta}{1+\eta_{base}^s(v,\theta)/\cos\theta}\right) w(\theta)d\theta \frac{\mathcal{F}_{thin}(I(z_i))_{SB+}}{\mathcal{F}_{base}(I(z_i))_{SB+}}$$

$$\approx \overline{r(v)e^{-i\varphi(v)}}e^{-i4\pi v\Delta z_{HCF}\cos\theta_o}$$

$$\equiv E(v)$$

where $\eta_{base}^s$ and $\eta_{base}^p$ are given by equation 17 and where $$E(v) \equiv a_E(v)e^{i\varphi_E(v)} \qquad 33)$$

$$= \frac{1}{2}\int_0^{\pi/2}\left(\frac{1-Y_p^*(v,\theta)\cos\theta}{1+Y_p^*(v,\theta)\cos\theta} + \frac{1-Y_s^*(v,\theta)/\cos\theta}{1+Y_s^*(v,\theta)/\cos\theta}\right)e^{-i4\pi v\Delta z_{HCF}\cos\theta}w(\theta)d\theta$$

Thus, as set out above, the ratio determiner 110, having been provided with the refractive index $n_{base}$ of the base 82 by the user at the start of the layer structure determination procedure: 1) calculates the bracketed field reflectance term of equation 29 or 32 (depending on the objective numerical aperture, 2) determines the ratio between the positive frequency space sideband of the frequency transform of the layer structure intensity data for a particular surface pixel of the layer structure and the positive frequency space sideband of the frequency transform of the base intensity data for a particular surface pixel of the base 82, if both transforms exceed a threshold, typically set at 5% of their maximum value; 3) then multiplies the field reflectance term by the frequency transform ratio to obtain the normalised $HCF(v)$ ratio; and 4) supplies the determined normalised ratio $HCF(v)$ to the data fitter 112, under the control of the controller 21. If the threshold is not reached, then the controller will cause the display to display a message to prompt the user to increase the light level, avoiding saturation, and then to repeat the measurement operations on both the base 82 and the layer structure 81 using the new light level. If the threshold is still not reached and the light level cannot be further increased, then the controller will cause the display to display a message to advise the user that that particular sample cannot be measured.

The data fitter 112 is arranged to determine the parameters that define the optical admittance Y, that is the thicknesses and dispersive refractive indices of the layers of the layer structure 81 (the dispersive refractive index of the substrate 80 being known or provided by the user), by using a thin film optimisation fitting procedure to fit the parameters to the calculated normalised ratio HCF(υ).

As can be seen from equation 29 (or 32 for larger numerical aperture) above, the normalised HCF(υ) ratio has an amplitude component r(υ), a phase component $e^{-i\Phi(\upsilon)}$ and a helical phase component $e^{-i4\pi\upsilon\Delta z_{HCF}}$. The fitting procedure therefore makes use of both the amplitude and phase information provided by the normalised HCF(υ) ratio and therefore should enable more accurate characterisation of the layer structure 81, enabling both the dispersive refractive index and the layer thickness to be obtained for each layer of the layer structure 81.

In this example the data fitter 111 is arranged to use a conjugate gradient method or a simulated annealing method. These techniques are discussed in 'Numerical Recipes in Fortran: The Art of Scientific Computing, Second Edition' by William H. Press, Saul A. Teukolsky, William T. Vettering and Brian R. Flannery (ISBN 0-521-43064) in section 10.6 at pages 413 to 416 and section 10.9 at pages 436 to 438. The conjugate gradient method starts from the steepest descent method first proposed by Cauchy in which the procedure steps from point to point by minimising along the direction of the local gradient until a merit function calculated after each step reaches a desired value but, rather than proceeding in the direction of the new gradient at each step, proceeds in a direction which is conjugate to the old gradient. In this example, the data fitter uses a conjugate gradient method based on the approach proposed by Fletcher-Reeves discussed in the aforementioned section 10.6 of 'Numerical Recipes in Fortran' is used and evaluates the merit function below $$\varepsilon = \sum_{j=1}^{J}(a_{HCF}(v_j)\cos\varphi_{HCF}(v_j) - a_E(v_j)\cos\varphi_E(v_j))^2 + \sum_{j=1}^{J}(a_{HCF}(v_j)\sin\varphi_{HCF}(v_j) - a_E(v_j)\sin\varphi_E(v_j))^2 + \sum_{j=1}^{J}(a_{HCF}(v_j) - a_E(v_j))^2 \qquad 34)$$

where the range of frequencies corresponds to the subset of the Fourier positive frequency arm $$\left(\frac{1}{2N\Delta z_{step}}, \dots, \frac{N/2}{2N\Delta z_{step}}\right)$$

for which $\Im(I_{thin}(\overline{Z_k}))_{SB+}$ and $\Im(I_{base}(\overline{Z_k}))_{SB+}$ both exceed a threshold, typically set at 5% of their maximum value.

All such fitting procedures require an initial starting position for the fitting procedure. In this case, this requires the user to provide the number of layers, approximate refractive indices and approximate thicknesses of the layers of layer structure 81 together with an approximate value for the dispersive refractive index of the substrate 80 (although the latter would typically be known accurately). Where the method is being used for characterisation of a layer structure during quality control procedures to determine how well, for example, a thin film manufacturing process has produced a required structure, the user should have a good idea as to what the layer structure was intended to be and can provide a good guess at the layer indices and thicknesses. The better the initial guess the smaller the number of steps that should be required for the fitting procedure to converge to an acceptable merit function value. However, even where the user does not have a good idea of the initial layer structure, the fitting procedure should converge to the required merit function value, although this may require a large number of steps in the fitting procedure and is clearly dependent on the complexity of the layer structure.

In this example, each layer f of the layer structure 81 is assumed to have a dispersive refractive index $n_f(\lambda)$ which is a linear combination of a high known dispersive refractive index $n_H(\lambda)$ and a low known dispersive refractive index $n_L(\lambda)$, as follows:

$$n_f(\lambda) = \alpha n_H(\lambda) + (1-\alpha) n_L(\lambda) \qquad 35)$$

where the high known dispersive refractive index $n_H(\lambda)$ is that for titanium dioxide and the low known dispersive refractive index $n_L(\lambda)$ is that for silicon dioxide, and, in this example, rather than determining the actual dispersive refractive index, the fitting procedure determines α for each layer. This is a convenient way of handling dispersive materials in that it typically provides a good representation of a dispersive index but with only a single variable.

Thus, when the merit function reaches the preset desired value, the fitting procedure will have provided, for each layer, a thickness d and a value for α, from which the data fitter can determine the dispersive refractive index using equation 35. As can be seen from equation 29 the fitting procedure also determines a value for the 'helical' net z-offset $\Delta z_{HCF}$. Dependence on the 'helical' net z-offset $\Delta z_{HCF}$, can be removed, if desired, by basing the merit function entirely on amplitude terms:

$$\varepsilon = \sum_{j=1}^{J}(a_{HCF}(v_j) - a_E(v_j))^2 \qquad 36)$$

Reasonable performance would be expected from this amplitude-only equivalent (especially since this essentially the same information is provided by a spectrophotometer, given that a spectrophotometer in reflection mode measures $r^2(v)$). As another possibility the merit function shown in equation 34 may be used without the amplitude terms shown in equation 36.

It will be appreciated that the above analysis is provided to assist in the understanding of the technique and that different approaches may be adopted to this analysis. The actual analysis technique used is not important. Rather, what is important is the realisation characteristics of a layer structure such as the thickness of each layer and its dispersive index can be extracted by setting a ratio related to the ratio between Fourier transforms of the intensity data (in the example described above the ratio of the positive frequency space sidebands of the Fourier Transforms) obtained in respective measurement operations on a base 82 of known dispersive index and on the layer structure 81 equal to an optical admittance ratio term that allows the use of thin film fitting procedures to extract the layer characteristics and that makes use of both the amplitude and the phase information available from the measurement operations.

Figure 7:
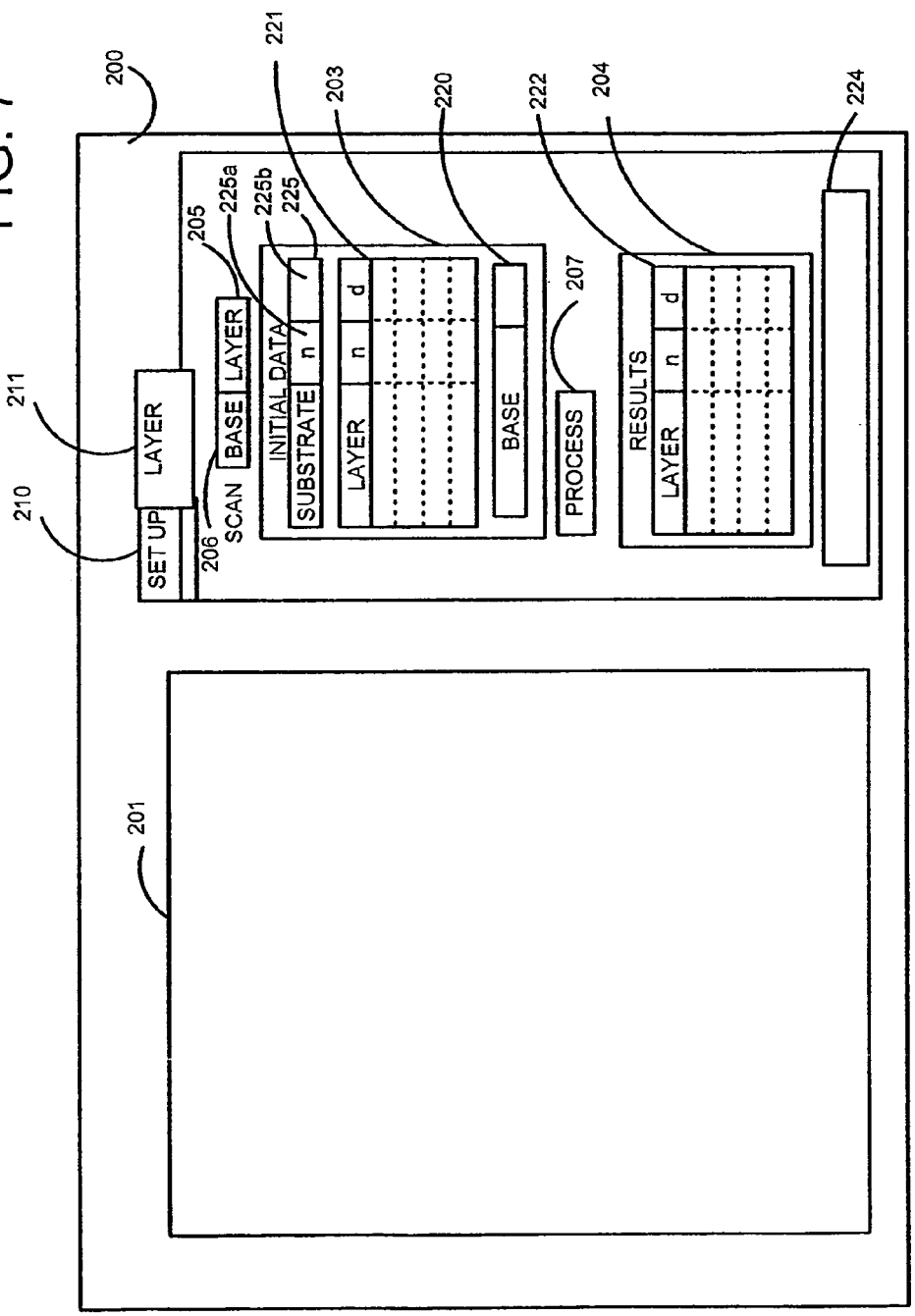
FIG. 7 shows an example of a display screen that may be displayed to a user by a display of a user interface of the apparatus.

Operation of the apparatus described above to determine a thin film structure will now be described with the aid of FIGS. 7 to 11 in which FIG. 7 shows an example of a display screen 200 that may be displayed to the user by the display 36a (see FIG. 5) of the user interface 31 and FIGS. 8 to 11 show flowcharts for illustrating the operation.

Although not shown in FIG. 7, the display screen 200 may have a Windows (RTM) type appearance. The display screen 200 provides a window 201 for displaying to the user an image representing a frame of intensity data acquired by the detector 10 and a number of tabbed panes that provide instructions to the user and enable the user to input required data. As shown there are two tabbed panes, a set up pane 210 and a layer pane 211. Although not shown, the set up pane allows the user to align the sample under test using the image displayed in the window 201, to select an illumination level by adjusting the light intensity output user control 400, to adjust the Z position until interference fringes are visible in the window 201 and to set the scan path length and scan path interval. These set up procedures are described in greater detail in International Application publication number WO2004/048886, the whole contents of which are hereby incorporated by reference.

The layer pane 211 provides an initial data window 203 (which may be a drop down or pop-up window), scan buttons 205 and 206 for initiating a scan of the layer structure 81 or base 82, respectively, a process button 207 for initiating processing of the intensity data once the scans of the layer structure and base have been completed, and a results window 204 (which may be a drop down or pop-up window) for displaying to the user the results of the processing.

The initial data window 203 has a data entry box 220 labelled "base" for enabling the user to enter the refractive index of the base 82 or alternatively the material from which the base 82 is made, if the ratio determiner 110 has access to data giving the refractive indices for likely base materials, such as BK7 glass. The initial data window also has a data entry window 225 labelled "SUBSTRATE" having a box 225a for entering the dispersive refractive index of the substrate 80 (or the material from which it is made, if the data fitter 111 has access to data associating materials with dispersive refractive indices) and a table 221 with columns headed "LAYER", refractive index n and thickness d for enabling a user to input using the keyboard 31a their expected or best guess for the thin film layer structure in terms of the layer sequence, thickness and the dispersive refractive indices of the layers (or the materials from which they are made, if the data fitter 111 has access to data associating materials with dispersive refractive indices). The layer pane 211 may enable the user to tick a check box 225b to indicate that the value given for the dispersive refractive index of the substrate 80 is an actual value, not an estimate, where this value is known, for example because the substrate 80 and the base 82 are parts of the same sample. In this case the data fitter will not need to determine the dispersive refractive index of the substrate 80.

The results data window 203 similarly has a table 222 with layer, refractive index n and thickness d columns for displaying the refractive index n and thickness d determined by the layer structure determiner 100 for successive layers of the layer structure.

Assuming the user has carried out initial set up procedures to align the sample, and to select the scan length and scan step, the user then moves or causes the sample support stage 9 to be moved under the control of the control apparatus 30 in the XY plane to bring the base 82 into the field of view of the detector 10 and, using the set up pane, adjusts the coarse Z position until fringes are visible to set the start position for the scan and then adjusts the tilt of the stage 9 to produce near-minimum fringe densities to ensure that the sample surface is parallel to the reference mirror, as discussed above. The user then selects the "base" scan button 206 to commence scanning of the selected surface area of the base 82 to carry out the base measurement operation. The controller 21 may keep the user informed as to the progress of the scan by displaying a message or graphical representation indicating the progress of the scan in a user dialogue window 224.

Once the scan of the selected surface area of the base 82 has been completed, the user, again using the set up window and the image displayed in the window 201, moves the sample support stage 9 in the xy plane to bring a surface area of the thin film structure into the field of view of the detector 10, checks that the illumination setting is, as is required, the same as for the base measurement operation, if necessary readjusts the coarse Z position to ensure that the interference fringes are visible in the image displayed in the window 201 and readjusts the tilt of the stage 9 to produce near-minimum fringe densities to ensure that the sample surface is still parallel to the reference mirror, as discussed above, and then instructs the apparatus to carry out a layer measurement operation by selecting the "layer" scan button 205.

When the controller 21 informs the user via the user dialogue window 224 that the scan of the selected surface area of the layer structure 81 is completed, then the user can select the process button 207 to begin processing the acquired data. If the user has not already input the initial data into the initial data window 203, then the controller 21 will cause the user dialogue window 224 to display a message or graphical representation prompting input of the initial data.

Once the controller 21 determines that the initial data has been provided, then the controller 21 causes the layer structure determiner 100 to commence determination of the layer structure.

It will of course be appreciated that the display screen 200 shown in FIG. 7 is only an example and that there are many different ways in which the user interface may be designed to enable acquisition of data from the user and display of data and messages to the user.

It will also be appreciated that the thin film structure may be evaluated either at individually selected pixels or, to improve the signal-to noise, using averaged intensity data corresponding to a region of pixels. Dependent upon the sensing device, it may be possible for the averaging process to be carried out by the sensing device rather than the data processor.

Figure 8:
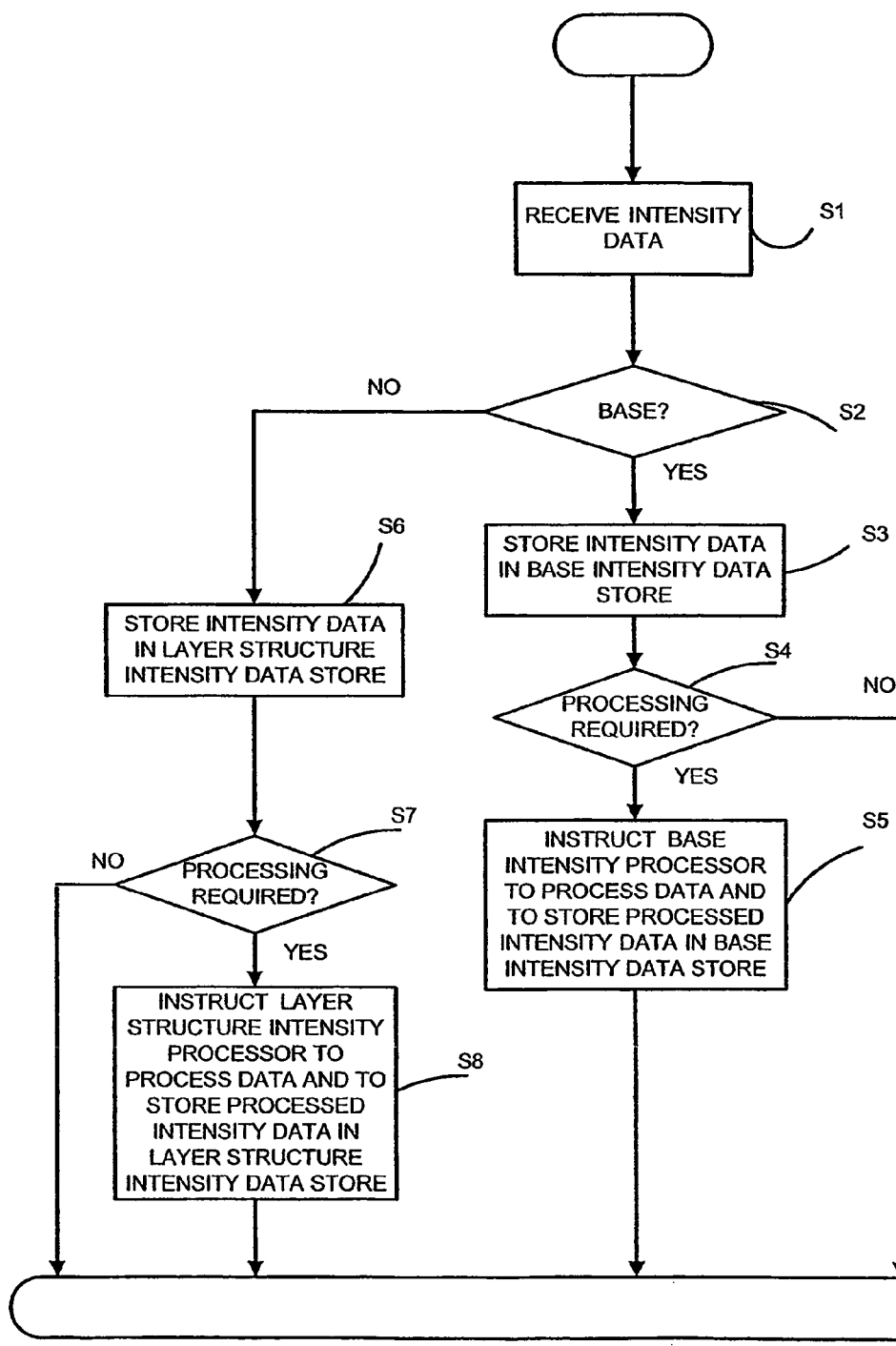
FIGS. 8 to 11 show flow charts for explaining operation of the layer structure determiner shown in FIG. 6.

Referring now to FIG. 8, when a frame of image data is received from the interferometer system by the intensity data receiver 33 at S1, the controller 21 determines at S2 whether the intensity data is base intensity data, that is whether the scan resulted from the user selecting the base button 205 or the layer button 206 in FIG. 7. If the answer is yes, then at S3, the controller 21 instructs the intensity data storer 101 to store the intensity data in a section of the base intensity data store 103 for that frame. The intensity data storer 101 may then check with the controller 21 whether the base intensity data is to be processed at S4 and, if so, will cause the base intensity data processor 104 to process the base intensity data and to store the processed base intensity data in a section of the base intensity data store 103 for processed data for that frame at S5. For example, the base intensity data processor 104 may process the data by averaging the intensity data over a number of adjacent surface pixels to improve the signal to noise ratio for the base which is assumed to be optically flat.

If, however, the answer at S2 is no, then at S6, then the controller 21 causes the intensity data storer 101 to store the intensity data in a section of the layer structure intensity data store 102 for that frame. The intensity data storer 101 may then check at with the controller 21 whether the layer structure intensity data is to be processed at S7 and, if so, will cause the layer structure data processor 105 to process the layer structure intensity data and store the processed layer structure intensity data in a section of the layer structure intensity data store 102 for processed data for that frame at S8. For example, the layer structure intensity data processor 105 may process the data by averaging the intensity data over a number of adjacent surface pixels to improve the signal to noise ratio.

The steps shown in FIG. 8 are repeated for each frame of image data for each of the base and layer structure scans.

Figure 9:
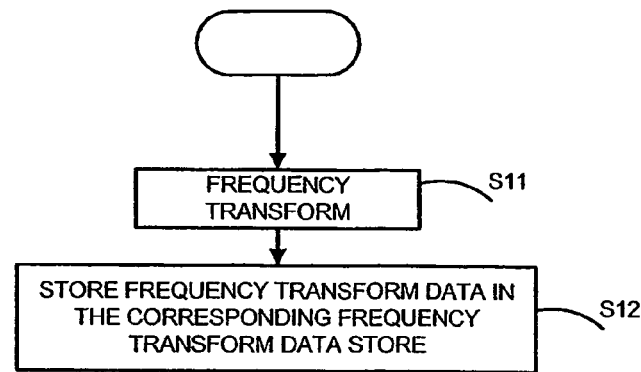

When the controller 21 determines that all of the required scan data has been acquired and stored for the base and layer structure scans, that the user has input the initial data and that the user has selected the "process" button 207, the controller 21, at S11 in FIG. 9, instructs the frequency transformer 106 to determine the frequency transform of the intensity data for a selected surface pixel by, in this example, carrying out a Fast Fourier Transform (FFT) process on the intensity data, and instructs the frequency transformer 106 to store the frequency transform data in the appropriate one of the base frequency transform data store 109 and the layer structure frequency transform data store 108.

The controller 21 then causes the ratio determiner 110 to determine at S20 in FIG. 9 the normalised HCF(υ) ratio set out in equation 17a or 17b using the base dispersive refractive index provided by the user or determined from the data input by the user identifying the material of the substrate and stored dispersive refractive index data.

Figure 10:
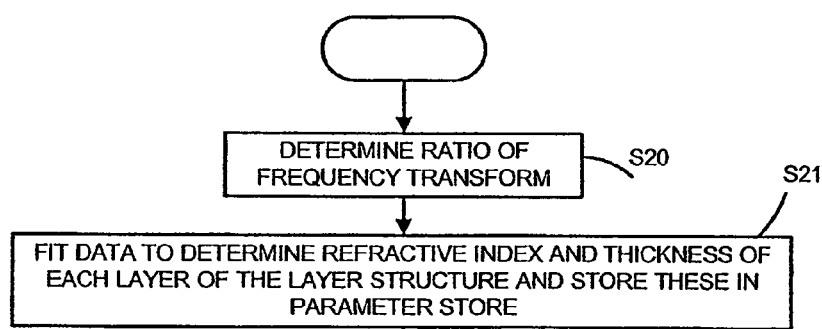
Figure 11:
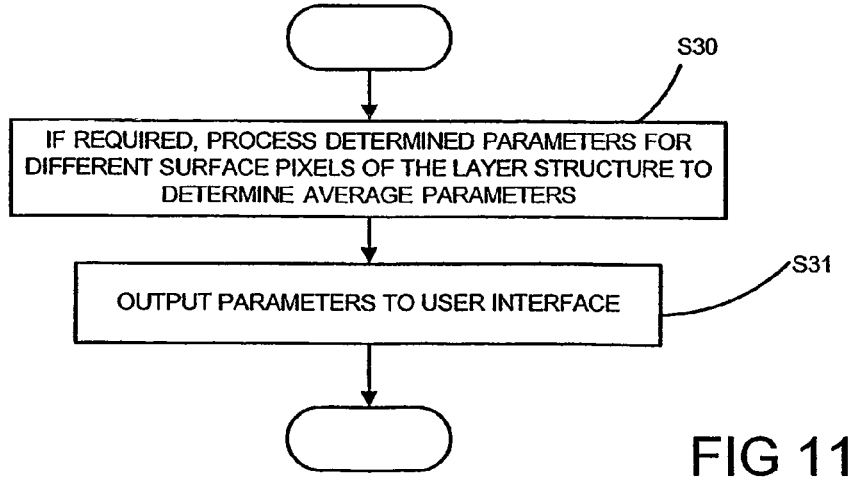

Once the normalised HCF(υ) ratio has been determined, then at S21 in FIG. 10, the controller 21 causes the data fitter 111 to carry out a data fitting procedure on the basis of equations 23, 24 and 30 or 32 and 34 above using, in this example, the conjugate gradient method described above so that when the merit function of equation 33 reaches the required value, the fitting procedure will provide a thickness value d and a parameter value a for each layer of the layer structure 81. The data fitter 111 stores these in the parameter store 112.

The apparatus maybe configured to provide as part of the set-up pane, an option for the user to select either the low numerical aperture approximation of equations 17a and 18a or the larger numerical aperture approach of equations 17b and 18b. As another possibility, where the apparatus is intended to be used in characterising specific types of layer structures, then the apparatus maybe configured to use only the numerical aperture approach commensurate with that purpose. The apparatus may alternatively be designed always to use the larger numerical aperture approach, although this is computationally more complex. It may be possible to automate the selection of small or large numerical aperture approach by testing, on the basis of the initial guesses at the thicknesses and dispersive indices provided by the user, the effect of using the low numerical aperture approach.

The controller 21 may cause the frequency transformer 106, ratio determiner 110 and data fitter 111 to repeat the above procedures for a number of further surface pixels of the stored intensity frames and/or the user may instruct the apparatus to carry out further scans on different surface areas of the sample under test to obtain further values for the parameters. If this optional procedure is carried out, then, when it is completed, the controller 21 instructs the layer structure parameter provider 113 at S30 in FIG. 11 to average the obtained parameters for different surface pixels of the layer structure to obtain average thickness and a parameter values. The layer structure parameter provider 113 then determines the actual dispersive refractive index for each layer in accordance with equation 34 using the determined α values (or averaged determined α values) and supplies at S31 in FIG. 11 the determined dispersive refractive indices n along with the determined thicknesses d (or averaged thicknesses) to the user interface 31 for display in the results window 204 of the display screen 200.

The user can then repeat the above procedure for other samples, if desired.

The detector 10 may exhibit photon noise so requiring the application of noise reduction techniques to the extracted HCF function or ratio. For any real coated surface, there will inevitably be a variation in the correlation data sets that are produced through the action of stepping (or scanning) the objective lens/sample surface distance while storing interferograms at regular intervals. These correlation differences are due to (i) the intrinsic surface form (including surface roughness) together with (ii) the fact that the surface is very likely to be tilted with respect to the reference mirror. Any known noise reduction technique that takes these correlation differences into account may be used. FIG. 12 shows a graph of phase change on reflection (in radians) against wavelength ($\lambda$) after the application of such a noise reduction technique to the extracted HCF function, illustrating by way of the solid dots E the extracted phase change on reflection and by way of the solid line F the fitted phase change on reflection for a triplet thin film. As can be seen, FIG. 12 shows good agreement between the extracted and fitted phase change on reflection.

The above thin film analysis process has been shown, through simulation, to extract layer thickness to less than 0.1%. As an example the layer structure of an anti-reflection coating consisting of an aluminum oxide ($Al_2O_3$) layer, a zirconium dioxide ($ZrO_2$) layer and a magnesium fluoride ($MgF_2$) layer on a BK7 glass substrate has been simulated; this provided layer thicknesses of 75.62 nm (nanometers), 124.85 nm and 90.16 nm and a $\Delta z_{HCF}$ value of 50 nm. In this instance the numerical aperture was nominally zero and the initial starting values for the optimised parameters were several percent different from the true values. In addition, comparative experimental tests have been carried out using a Taylor Hobson Nanostep (RTM) contact surface profiling instrument. In one test of a single layer of $TiO_2$ deposited on BK7 glass, the Nanostep instrument gave a thickness (at the edge of the thin film layer) of 61 nm while the above method, using a Mirau interference objective with an numerical aperture of 0.4, provided a thickness of 59 mm and a dispersive refractive index at a wavelength of 610 nm of 2.44.

Although as described above the layer structure determiner 100 is arranged to process the stored intensity data for one surface pixel at a time, if sufficient processing power is available, the layer structure determiner 100 may process intensity data for different surface pixels in parallel. It may also be possible to carry out the frequency transformation processes in parallel for the base and layer structure.

As described above the layer structure to be determined consists of one or more thin films, that is the thickness of each layer is less than the coherence length of the broadband source. As the layer thickness approaches the coherence length, the correlation function:

$$\Re\left[\mathscr{F}\left(\overline{A_R^o(v)}\overline{A_S^o(v)}e^{i\Delta^o\varphi(v)}\right)\right]$$

(where $\Re$ indicates the real part) begins to take on the form of two distinct quasi-Gaussian functions, each corresponding to a respective one of the interfaces and conventional thick film techniques can be applied because the two correlation functions can be distinguished. Continuity between the above approach to determining thin film structures and the conventional thick film approach where there is one distinct correlation maximum per interface can be shown analytically by expanding the optical admittance as a Fourier series.

It has been demonstrated by computer simulation that, over a wide range of numerical aperture values, there is close agreement between $E(\upsilon)$ and $HCF(\upsilon)$. This close agreement is understood to be due essentially to the common mode rejection of defocus effects within $HCF(\upsilon)$.

The approach described above to determining layer structure characteristics should be applicable to any layer structure in which the layer structure provides an electrical field 'signature' (ie a variation in amplitude and/or phase) over the spectral range of the apparatus. This implies that the minimum layer thickness that can be determined using this approach is likely to be approximately 25 nm. It may be possible to use this technique even with thin metal layers, that is metal layers that are not so thick as to behave effectively as bulk metal as the field reflectance from such a metal layer exhibits negligible dependence on small thickness variations. In the event that the above-described approach is to be used for significantly absorbing dielectric layers or thin metal layers, then $n_t$ should be replaced by $n_t - ik_t$ in equation 23 above.

In the above, various equations (see equations 15a and 15b, 27, 28, 29 and 32) include the complex conjugate of a bracketed n base ratio and various equations (see for example equation 16a) include the complex conjugate Y* of the optical admittance. It will, of course, be appreciated that whether an equation contains a quantity or its complex conjugate will be dependent on the polarity of the exponent of the Fourier Transform and, that if the other polarity is used (the Inverse Fourier Transform in this case), then the complex conjugates will be replaced by the quantities.

The thickness of multilayer layer structure that may be determined will depend on the coherence length of the light source and would be expected to be approximately 1-2 µm. However, for single thick layers, given the continuity of this approach with the conventional thick film approach where there is one distinct correlation maximum per interface, the maximum layer thickness should be determined by the scan length.

The above description assumes that the spectral range of light source is in the visible. It could, however, extend into or lie within the infra red or ultra violet regions of the spectrum.

As described above, the base 82 has an un-coated surface. The base itself may, however, carry a layer structure, provided that it is well-characterised. As will be appreciated by those skilled in the art, where the base 82 carries a layer structure, the characteristic required will be the dispersive admittance rather than the dispersive refractive index $n_{base}$.

The apparatus described above may form part of a thin film manufacturing system. FIG. 13 shows a simple block diagram of a thin film manufacturing system 400 comprising thin film designing apparatus 401 that comprises, generally, computing apparatus similar to that shown in FIG. 5 programmed: to receive input from a user or operator identifying the features required of the thin film structure such as the required base or substrate, the materials to be used to form the thin film structure, the number of layers and for example the optical characteristics (such as the optical admittance) required of the thin film structure; and to design a thin film structure consisting of layers of the user selected materials having thicknesses that provide the required optical characteristic following, for example, the teaching of the afore-mentioned text book 'Thin-Film Optical Filters' by H Angus Macleod (ISBN 0 7503 0688 2). As another possibility, the user may specify the thicknesses and number of thin film layers in the structure. The thin film designing apparatus 401 provides control instructions for enabling a thin film deposition apparatus 402 to cause the required thin film layer structure to be formed on the required substrate. The thin film deposition apparatus 402 may be configured to form the thin film structure on the base or substrate using any known thin film deposition technique(s) such as sputtering, Low Pressure Chemical Vapour Deposition (LPCVD), Metal Organic Vapour Deposition (MOCVD), Molecular Beam Epitaxy (MBE) and so on. Once the thin film layer structure has been formed or deposited on the substrate, the resulting thin film product 404 comprising a thin film structure 405 on a substrate 406 is passed to a thin film structure analysing apparatus 403 which is constructed and operates as described above with reference to FIGS. 1 to 11 to determine the thin film structure. The thin film structure analysing apparatus 403 determines the thin film structure as described above and may provide control information for at least one of the thin film designing apparatus 401 and the thin film designing apparatus 401 to enable the designing and/or manufacturing process to be modified in accordance with the results of the thin film analysis by the thin film structure analysing apparatus 403.

What is claimed:

1. Apparatus for determining information relating to a sample layer structure, the apparatus comprising:
    a beam splitter configured to direct light along a sample path towards a region of a surface of a sample and along a reference path towards a reference surface such that light reflected by the region of the sample surface and light reflected by the reference surface interfere;
    a mover configured to effect movement of at least one of the sample and the reference surface so as to effect relative movement along a measurement scan path between the sample and the reference surface;
    a sensing device configured to sense light representing the interference fringes produced by a sample surface region during relative movement along the measurement scan path;
    a controller configured to carry out a measurement operation by causing the mover to effect relative movement while the sensing device senses light intensity at intervals to provide a series of intensity values representing interference fringes produced by a region of a sample surface during the relative movement; and
    a data processor configured to receive and process first intensity data comprising a first series of intensity values resulting from a measurement operation on a first sample surface area having a layer structure and second intensity data comprising a second series of intensity values resulting from a measurement operation on a characterised second sample surface area, the data processor comprising:

a frequency transform ratio determiner configured to determine a ratio between frequency transformed first intensity data and frequency transformed second intensity data; and a data fitter configured to fit a layer structure model having variable model parameters related to the layer thicknesses and refractive indices of the layers of a layer structure to the ratio determined by the ratio determiner by adjusting the model parameters, thereby obtaining for the model parameters values representing the layer thicknesses and refractive indices of the layers of the sample layer structure.

2. Apparatus according to claim 1, wherein the frequency transform ratio determiner comprises a frequency transformer configured to determine first frequency transformed data corresponding to the first intensity data and second frequency transformed data corresponding to the second intensity data and a ratio determiner configured to determine the frequency transform ratio by dividing one of the first and second frequency transformed data by the other of the first and second frequency transformed data.

3. Apparatus according to claim 1, wherein the frequency transform ratio determiner comprises a frequency transformer configured to determine first frequency transformed data corresponding to the first intensity data and second frequency transformed data corresponding to the second intensity data and a ratio determiner configured to determine the frequency transform ratio by dividing one of the first and second frequency transformed data by the other of the first and second frequency transformed data and multiplying that ratio by a field reflectance term.

4. Apparatus according to claim 1, wherein the frequency transform ratio determiner comprises a frequency transformer configured to determine first frequency transformed data corresponding to the first intensity data and second frequency transformed data corresponding to the second intensity data and a ratio determiner configured to determine the frequency transform ratio by dividing one of the first and second frequency transformed data by the other of the first and second frequency transformed data and by multiplying that ratio by a field reflectance term:

$$\left(\frac{1-n_{base}(v)}{1+n_{base}(v)}\right)^{\dagger}$$

where $n_{base}(v)$ is the refractive index at frequency v of the second sample surface area and † indicates either the ratio or its complex conjugate.

5. Apparatus according to claim 1, wherein the data processor is configured to receive and process second intensity data comprising the second series of intensity values resulting from the measurement operation on the characterised second sample surface area having a layer structure and being characterised by having a defined dispersive admittance.

6. Apparatus according to claim 1, wherein the ratio determiner is configured to determine $$HCF(v) = \left(\frac{1-n_{base}(v)}{1+n_{base}(v)}\right)^{\dagger} \frac{\mathcal{F}_{thin}(I(Z_k))_{SB\dagger}}{\mathcal{F}_{base}(I(Z_k))_{SB\dagger}}$$

where † indicates either the ratio or its complex conjugate, where $n_{base}(v)$ is the refractive index at frequency v of the second sample surface area, and where $$\frac{F_{thin}(I(Z_k))_{SB\dagger}}{F_{base}(I(Z_k))_{SB\dagger}}$$

is the ratio between the frequency transformed first intensity data and the frequency transformed second intensity data.

7. Apparatus according to claim 1, wherein the ratio determiner is configured to determine:

$$HCF(v) \equiv a_{HCF}(v)e^{i\varphi_{HCF}(v)}$$

$$= \frac{1}{2}\int_0^{\pi/2}\left(\begin{array}{c}\frac{1-\eta_{base}^p(v,\theta)\cos\theta}{1+\eta_{base}^p(v,\theta)\cos\theta}+\\\frac{1-\eta_{base}^s(v,\theta)/\cos\theta}{1+\eta_{base}^s(v,\theta)/\cos\theta}\end{array}\right)w(\theta)d\theta\frac{\mathcal{F}_{thin}(I(z_i))_{SB\dagger}}{\mathcal{F}_{base}(I(z_i))_{SB\dagger}}$$

$$\approx \overline{r(v)e^{-i\varphi(v)}}e^{-i4\pi v\Delta z_{HCF}\cos\theta_o}$$

$$\equiv E(v)$$

where $$\eta_{base}^s = \eta_{base}(v)\sqrt{1-\sin^2\theta_0/\eta_{base}(v)}$$

$$\eta_{base}^p = \frac{\eta_{base}(v)}{\sqrt{1-\sin^2\theta_0/\eta_{base}(v)}}$$

and where † indicates either the ratio or its complex conjugate, where $n_{base}(v)$ is the refractive index at frequency v of the second sample surface area, and where $$\frac{F_{thin}(I(Z_k))_{SB\dagger}}{F_{base}(I(Z_k))_{SB\dagger}}$$

is the ratio between the frequency transformed first intensity data and the frequency transformed second intensity data, where θ is the angle of incidence accepted by the numerical aperture, where $$r(v)e^{i\varphi(v)}$$

is the resultant field reflectance at frequency v, where $a_{HCF}(v)$ is the amplitude of the HCF function at frequency v, $e^{i\varphi_{HCF}(v)}$ is the phase component of the HCF function at frequency v, and where $\Delta z_{HCF}=\Delta z-\Delta z_{base}$ where $\Delta z$ is the path difference for the first sample surface area and $\Delta z_{base}$ is the path difference for the second sample surface area.

8. Apparatus according to claim 1, wherein the layer structure model is a thin film layer structure optical admittance model.

9. Apparatus according to claim 1, wherein the layer structure model is a thin film layer structure optical admittance model:

$$E(v) = r^\dagger(v)e^{-i4\pi v \Delta z_{HCF}} = \left(\frac{1-Y^+(v)}{1+Y^+(v)}\right)e^{-i4\pi v \Delta z_{HCF}}$$

where the $r^\dagger$ and $Y^\dagger$ indicate, respectively, the electric field reflectance and optical admittance, or their complex conjugates, E(v) is the electric field at frequency v, $\Delta z_{HCF}=\Delta z-\Delta z_{base}$ where $\Delta z$ is the path length difference for the first sample surface area and $\Delta z_{base}$ is the path length difference for the second sample surface area.

10. Apparatus according to claim 1, wherein the layer structure model is a thin film layer structure optical admittance model:

$$E(v) \equiv a_E(v)e^{i\varphi_E(v)}$$

$$= \frac{1}{2}\int_0^{\pi/2}\left(\frac{1-Y_p^\dagger(v,\theta)\cos\theta}{1+Y_p^\dagger(v,\theta)\cos\theta}+\frac{1-Y_s^\dagger(v,\theta)/\cos\theta}{1+Y_s^\dagger(v,\theta)/\cos\theta}\right)e^{-i4\pi v\Delta z_{HCF}\cos\theta}w(\theta)d\theta$$

where † indicates the quantity or its complex conjugates, where θ is the angle of incidence accepted by the numerical aperture, where $Y_p$ and $Y_s$, indicate, respectively, the p and s polarisations of optical admittance, $a_E(v)$ is the amplitude of the electric field at frequency v, where $e^{i\varphi_E(v)}$ is the phase component of the electric field at frequency v, where E(v) is the electric field at frequency v, where $\Delta z_{HCF}=\Delta z-\Delta z_{base}$ where $\Delta z$ is the path difference for the first sample surface area and $\Delta z_{base}$ is the path difference for the second sample surface area.

11. Apparatus according to claim 1, wherein the data fitter is configured to use a conjugate gradient or simulated annealing fitting procedure to fit the model parameters to the ratio.

12. Apparatus according to claim 1, wherein the data fitter is configured to use the following merit function:

$$\varepsilon = \sum_{j=1}^{J}(a_{HCF}(v_j)\cos\varphi_{HCF}(v_j)-a_E(v_j)\cos\varphi_E(v_j))^2 +$$

$$(a_{HCF}(v_j)\sin\varphi_{HCF}(v_j)-a_E(v_j)\sin\varphi_E(v_j))^2$$

or the merit function:

$$\varepsilon = \sum_{j=1}^{J}(a_{HCF}(v_j)\cos\varphi_{HCF}(v_j)-a_E(v_j)\cos\varphi_E(v_j))^2 +$$

$$\sum_{j=1}^{J}(a_{HCF}(v_j)\sin\varphi_{HCF}(v_j)-a_E(v_j)\sin\varphi_E(v_j))^2 + \sum_{j=1}^{J}(a_{HCF}(v_j)-a_E(v_j))^2$$

where $a_{HCF}(v_j)$ is the amplitude of the HCF function at frequency $v_j$, $a_E(v_j)$ is the amplitude of the electric field at frequency $v_j$, $e^{i\varphi_{HCF}(v_j)}$ is the phase component of the HCF function at frequency $v_j$, where $e^{i\varphi_E(v_j)}$ is the phase component of the electric field at frequency $v_j$, and where $e^{i\phi}=\cos\phi+i\sin\phi$.

13. Apparatus according to claim 1, wherein the data fitter is configured to use the following merit function:

$$\varepsilon = \sum_{j=1}^{J}(a_{HCF}(v_j)-a_E(v_j))^2$$

where $a_{HCF}(v_j)$ is the amplitude of the HCF function at frequency $v_j$ and $a_E(v_j)$ is the amplitude of the electric field at frequency $v_j$.

14. Apparatus according to claim 1, wherein the frequency transform ratio determiner is configured to determine the frequency ratio such that it is equivalent to a term having an amplitude component, a phase component and a helical phase component.

15. Apparatus according to claim 1, wherein the frequency transform ratio determiner is configured to use a Fourier transform to convert data into frequency space.

16. Apparatus according to claim 1, wherein the data processor is configured to average the first series of intensity values resulting from measurement operations on a number of adjacent regions of the first sample surface area to provide the first intensity data.

17. Apparatus according to claim 1, wherein the data processor is configured to average the second series of intensity values resulting from measurement operations on a number of regions of the second sample surface area to provide the second intensity data.

18. Apparatus according to claim 1, wherein the frequency transform ratio determiner is configured to adjust the first and second series of intensity vales to position a maximum or minimum intensity value at or close to zero before frequency transformation.

19. Apparatus according to claim 1, configured to carry out measurement operations on plural surface areas of a sample having a layer structure.

20. Apparatus according to claim 1, further comprising a broadband light source.

21. Data processing apparatus for processing series of intensity values provided by a coherence scanning interferometer, the data processing apparatus being configured to receive a first series of intensity values resulting from a measurement operation on a first sample surface area having a layer structure and a second series of intensity values resulting from a measurement operation on a characterised second sample surface area and the data processor comprising:
  a frequency transform ratio determiner configured to determine a ratio between frequency transformed first intensity data and frequency transformed second intensity data; and
  a data fitter configured to fit variable model parameters related to characteristics of a layer structure of a layer structure model to the determined ratio to obtain for the model parameters values representing the characteristics of the sample layer structure.

22. Data processing apparatus according to claim 21, wherein the frequency transform ratio determiner is configured to determine the ratio by dividing one of the transformed first and second intensity data by the other of the transformed first and second intensity data.

23. A method of determining information relating to a sample layer structure, the method comprising the steps of:
  carrying out respective measurement operations on a first sample surface area having a layer structure and a characterised second sample surface area -by, in each measurement operation, directing light along a sample path towards a region of the sample surface and along a reference path towards a reference surface such that light reflected by the region of the sample surface and light reflected by the reference surface interfere and causing movement of at least one of the sample and the reference surface so as to cause relative movement therebetween along a measurement scan path between the sample and the reference surface while a sensing device senses light intensity representing interference fringes produced by the sample surface region at intervals during the relative movement to provide first intensity data comprising a first series of intensity values resulting from a measurement operation on the first sample surface area and second intensity data comprising a second series of intensity values resulting from a measurement operation on the second sample surface area;

frequency transforming the first intensity data to produce frequency transformed first intensity data, frequency transforming the second intensity data to produce frequency transformed second intensity data and determining a ratio between the frequency transformed first intensity data and the frequency transformed second intensity data to form a frequency transform ratio; and fitting a layer structure model having variable model parameters related to the layer thicknesses and refractive indices of the layers of a layer structure to the determined ratio by adjusting the model parameters, thereby obtaining for the model parameters values representing the layer thicknesses and refractive indices of the layers of the sample layer structure.

24. A method according to claim 23, wherein the ratio determining step determines the frequency transform ratio by dividing one of the first and second frequency transformed data by the other of the first and second frequency transformed data.

25. A method according to claim 23, wherein the ratio determining step determines the frequency transform ratio by dividing one of the first and second frequency transformed data by the other of the first and second frequency transformed data and multiplying that ratio by a field reflectance term.

26. A method according to claim 23, wherein the ratio determining step determines the frequency transform ratio by dividing one of the first and second frequency transformed data by the other of the first and second frequency transformed data and by multiplying that ratio by a field reflectance term:

$$\left(\frac{1-n_{base}(v)}{1+n_{base}(v)}\right)^{\dagger}$$

where $n_{base}(v)$ is the refractive index at frequency v of the second sample surface area and † indicates either the ratio or its complex conjugate.

27. A method according to claim 23, wherein the ratio determining step determines:

$$HCF(v) = \left(\frac{1-n_{base}(v)}{1+n_{base}(v)}\right)\frac{\mathcal{F}_{thin}(I(Z_k))_{SB\dagger}}{\mathcal{F}_{base}(I(Z_k))_{SB\dagger}}$$

where † indicates either the ratio or its complex conjugated, where $n_{base}(v)$ is the refractive index at frequency v of the second sample surface area, and where $$\frac{\mathcal{F}_{thin}(I(Z_k))_{SB\dagger}}{\mathcal{F}_{base}(I(Z_k))_{SB\dagger}}$$

is the ratio between the frequency transformed first intensity data and the frequency transformed second intensity data.

28. A method according to claim 23, wherein the ratio determining step determines the frequency transfer ratio:

$$HCF(v) \equiv a_{HCF}(v)e^{i\varphi_{HCF}(v)}$$

$$= \frac{1}{2}\int_0^{\pi/2}\left(\frac{1-\eta_{base}^p(v,\theta)\cos\theta}{1+\eta_{base}^p(v,\theta)\cos\theta} + \frac{1-\eta_{base}^p(v,\theta)\cos\theta}{1+\eta_{base}^p(v,\theta)\cos\theta}\right)w(\theta)d\theta\frac{\mathcal{F}_{thin}(I(z_i))_{SB\dagger}}{\mathcal{F}_{base}(I(z_i))_{SB\dagger}}$$

$$\approx \overline{r(v)e^{-i\varphi(v)}}e^{-i4\pi v\Delta z_{HCF}\cos\theta_o}$$

$$\equiv E(v)$$

where $$\eta_{base}^s = \eta_{base}(v)\sqrt{1-\sin^2\theta_0/\eta_{base}(v)}$$

$$\eta_{base}^p = \frac{\eta_{base}(v)}{\sqrt{1-\sin^2\theta_0/\eta_{base}(v)}}$$

and where † indicates the quantity or its complex conjugate, where $n_{base}(v)$ is the refractive index at frequency v of the second sample surface area, and where $$\frac{\mathcal{F}_{thin}(I(Z_k))_{SB\dagger}}{\mathcal{F}_{base}(I(Z_k))_{SB\dagger}}$$

is the ratio between the frequency transformed first intensity data and the frequency transformed second intensity data, where $r(v)e^{i\phi(v)}$ is the resultant field reflectance at frequency v, θ is the angle of incidence accepted by the numerical aperture, where $\Delta z_{HCF}=\Delta z-\Delta z_{base}$ where $\Delta z$ is the path difference for the first sample surface area and the $\Delta z_{base}$ is the path difference for the second sample surface area, where $a_{HCF}(v)$ is the amplitude of the HCF function at frequency v, and $e^{i\phi_{HCF}(v)}$ is the phase component of the HCF function at frequency v.

29. A method according to claim 23, wherein the layer structure model is a thin film layer structure optical admittance model.

30. A method according to claim 23, wherein the layer structure model is a thin film layer structure optical admittance model:

$$E(v) = r^{\dagger}(v)e^{-i4\pi v\Delta z_{HCF}} = \left(\frac{1-Y^{\dagger}(v)}{1+Y^{\dagger}(v)}\right)e^{-i4\pi v\Delta z_{HCF}}$$

where † indicates the quantity or its complex conjugate, E(v) is the electric field at frequency v, $\Delta z_{HCF}=\Delta z-\Delta z_{base}$ where Δz is the path length difference for the first sample surface area and the $\Delta z_{base}$ is the path length difference for the second sample surface area where Y is the optical admittance, and where r(v) indicates the electric field reflectance at frequency v.

31. A method according to claim 23, wherein the layer structure model is a thin film layer structure optical admittance model:

$$E(v) \equiv a_E(v)e^{i\varphi_E(v)} =$$
$$\frac{1}{2}\int_0^{\pi/2}\left(\frac{1-Y_p^\dagger(v,\theta)\cos\theta}{1+Y_p^\dagger(v,\theta)\cos\theta} + \frac{1-Y_s^\dagger(v,\theta)/\cos\theta}{1+Y_s^\dagger(v,\theta)/\cos\theta}\right)e^{-i4\pi v\Delta z_{HCF}\cos\theta}w(\theta)d\theta$$

where † indicates the quantity or its complex conjugate, where θ is the angle of incidence accepted by the numerical aperture, where $Y_p$ and $Y_s$ indicate, respectively, the p and s polarisations of optical admittance, where E(v) is the electric field at frequency v, where $\Delta z_{HCF} = \Delta z - \Delta z_{base}$ where Δz is the path difference for the first sample surface area and the $\Delta z_{base}$ is the path difference for the second sample surface area, where $a_E(v_j)$ is the amplitude of the electric field at frequency $v_j$, and $e^{i\varphi_E(v)}$ is the phase component of the electric field at frequency v.

32. A method according to claim 23, wherein the data fitting step uses a conjugate gradient or simulated annealing fitting procedure to fit the model parameters to the ratio.

33. A method according to claim 23, wherein the data fitting step uses the following merit function:

$$\varepsilon = \sum_{j=1}^{J}(a_{HCF}(v_j)\cos\varphi_{HCF}(v_j) - a_E(v_j)\cos\varphi_E(v_j))^2 +$$
$$(a_{HCF}(v_j)\sin\varphi_{HCF}(v_j) - a_E(v_j)\sin\varphi_E(v_j))^2$$

or the merit function:

$$\varepsilon = \sum_{j=1}^{J}(a_{HCF}(v_j)\cos\varphi_{HCF}(v_j) - a_E(v_j)\cos\varphi_E(v_j))^2 +$$
$$\sum_{j=1}^{J}(a_{HCF}(v_j)\sin\varphi_{HCF}(v_j) - a_E(v_j)\sin\varphi_E(v_j))^2 + \sum_{j=1}^{J}(a_{HCF}(v_j) - a_E(v_j))^2$$

where $a_{HCF}(v_j)$ is the amplitude of the HCF function at frequency $v_j$, $a_E(v_j)$ is the amplitude of the electric field at frequency $v_j$, $e^{i\varphi_{HCF}(v_j)}$ is the phase component of the HCF function at frequency $v_j$, where $e^{i\varphi_E(v_j)}$ is the phase component of the electric field at frequency $v_j$, and where $e^{i\phi} = \cos\phi + i\sin\phi$.

34. A method according to claim 23, wherein the data fitting step uses the following merit function:

$$\varepsilon = \sum_{j=1}^{J}(a_{HCF}(v_j) - a_E(v_j))^2$$

where $a_{HCF}(v_j)$ is the amplitude of the HCF function at frequency $v_j$ and $a_E(v_j)$ is the amplitude of the electric field at frequency $v_j$.

35. A method according to claim 23, wherein the frequency transform ratio determining step determines the frequency ratio such that it is equivalent to a term having an amplitude component, a phase component and a helical phase component.

36. A method according to claim 23, wherein the frequency transform ratio determining step uses a Fourier transform to convert data into frequency space.

37. A method according to claim 23, wherein the first series of intensity values resulting from measurement operations on a number of regions of the first sample surface area are averaged to provide the first intensity data.

38. A method according to claim 23, wherein the second series of intensity values resulting from measurement operations on a number of regions of the second sample surface area are averaged to provide the second intensity data.

39. A method according to claim 23, further comprising adjusting the first and second series of intensity values to position a maximum or minimum intensity value at or close to zero before frequency transformation.

40. A method according to claim 23, comprising carrying out measurement operations on plural surface areas of a sample having a layer structure.

41. A method according to claim 23, wherein the first and second sample areas are sample areas of the same sample.

42. A method according to claim 23, wherein the first and second sample areas are sample areas of different samples.

43. A method according to claim 23, wherein the light used is provided by a broadband light source.

44. A method of processing series of intensity values provided by a coherence scanning interferometer, the method comprising the steps of receiving first intensity data comprising a first series of intensity values resulting from a measurement operation on a first sample surface area having a layer structure and second intensity data comprising a second series of intensity values resulting from a measurement operation on a characterised second sample surface area and the data processing comprising:
  frequency transforming the first intensity data to produce frequency transformed first intensity data;
  frequency transforming the second intensity data to produce frequency transformed second intensity data;
  determining a ratio between the frequency transformed first intensity data and the frequency transformed second intensity data; and
  fitting variable model parameters related to characteristics of a layer structure of a layer structure model to the determined ratio to obtain for the model parameters values representing the characteristics of the sample layer structure.

45. A method according to claim 44, wherein the determining a ratio step comprises dividing one of the transformed first and second intensity data by the other of the transformed first and second intensity data.

46. Apparatus for determining information relating to a sample layer structure, the apparatus comprising:
  light directing means for directing light along a sample path towards a region of a surface of a sample and along a reference path towards a reference surface such that light reflected by the region of the sample surface and light reflected by the reference surface interfere;
  moving means for effecting movement of at least one of the sample and the reference surface so as to effect relative movement therebetween along a measurement scan path between the sample and the reference surface;

sensing means for sensing light representing the interference fringes produced by a sample surface region during relative movement along the measurement scan path;

control means for carrying out a measurement operation by causing the moving means to effect relative movement while the sensing means senses light intensity at intervals to provide a series of intensity values representing interference fringes produced by a region of a sample surface during the relative movement; and data processing means for receiving and processing first intensity data comprising a first series of intensity values resulting from a measurement operation on a first sample surface area having a layer structure and second intensity data comprising a second series of intensity values resulting from a measurement operation on a characterised second sample surface area, the data processing means comprising:

frequency transform ratio determining means for determining a ratio between frequency transformed first intensity data and frequency transformed second intensity data; and data fitting means for fitting a layer structure model having variable model parameters related to the layer thicknesses and refractive indices of the layers of a layer structure to the ratio determined by the ratio determining means by adjusting the model parameters, thereby obtaining for the model parameters values representing the layer thicknesses and refractive indices of the layers of the sample layer structure.

47. A method according to claim 23, wherein the second sample area does not carry a layer structure and is characterised by having a defined dispersive refractive index.

48. A method according to claim 23, wherein the second sample area carries a layer structure and is characterised by having a defined dispersive admittance.

49. A method of manufacturing a thin film product, which method comprises the steps of:

providing a thin film design for the thin film product;

depositing material onto a substrate in accordance with the thin film design to form a thin film product comprising the substrate carrying a thin film structure; and determining the thin film structure of the thin film product by carrying out a method in accordance with claim 23.

50. A method according to claim 49, further comprising controlling at least one of the providing a design step and the depositing steps in accordance with the thin film structure determined in the determining step to modify the thin film structure of the thin film product.

51. A storage medium carrying program instructions for programming processing means to carry out a method in accordance with claim 23.

52. A storage medium carrying program instructions for programming processing means to carry out a method in accordance with claim 44.

53. A computer programmed to perform the steps of the method of claim 23.

54. A computer programmed to perform the steps of the method of claim 44.

* * * * *